United States Patent
Tsuchiya

(10) Patent No.: US 11,920,947 B2
(45) Date of Patent: Mar. 5, 2024

(54) NOTIFICATION CONTROLLER AND ELECTRICALLY POWERED VEHICLE

(71) Applicant: Toyota Jidosha Kabushiki Kaisha, Toyota (JP)

(72) Inventor: Yoshiyuki Tsuchiya, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 558 days.

(21) Appl. No.: 16/928,214

(22) Filed: Jul. 14, 2020

(65) Prior Publication Data
US 2021/0018331 A1    Jan. 21, 2021

(30) Foreign Application Priority Data

Jul. 16, 2019 (JP) ................................. 2019-131263

(51) Int. Cl.
| | |
|---|---|
| *G01C 21/36* | (2006.01) |
| *B60K 35/00* | (2006.01) |
| *B60L 58/12* | (2019.01) |

(52) U.S. Cl.
CPC .......... *G01C 21/3697* (2013.01); *B60K 35/00* (2013.01); *B60L 58/12* (2019.02); *B60K 2370/164* (2019.05); *B60K 2370/169* (2019.05)

(58) Field of Classification Search
CPC ............ G01C 21/3697; G01C 21/3407; B60K 35/00; B60K 2370/164; B60K 2370/169;
(Continued)

(56) References Cited

U.S. PATENT DOCUMENTS

| | | | |
|---|---|---|---|
| 2020/0023750 A1* | 1/2020 | Fukami | B60L 58/25 |
| 2020/0149902 A1* | 5/2020 | Fujimoto | G06Q 20/145 |

(Continued)

FOREIGN PATENT DOCUMENTS

| | | | |
|---|---|---|---|
| CN | 105674996 A | | 6/2016 |
| CN | 206412793 U | * | 8/2017 |

(Continued)

OTHER PUBLICATIONS

Machine translation of JP-2015073369-A (Year: 2015).*
(Continued)

*Primary Examiner* — James J Lee
*Assistant Examiner* — Alexander George Matta
(74) *Attorney, Agent, or Firm* — Dinsmore & Shohl LLP

(57) ABSTRACT

A notification controller that controls a notification apparatus that gives a notification to a driver of an electrically powered vehicle includes a receiver, a first determination unit, and a first notification unit. When the receiver receives a prescribed leveling signal, the first determination unit determines whether or not the electrically powered vehicle can participate in power leveling at a prescribed participation spot, based on at least one of timing of start and timing of end of power leveling indicated by the prescribed leveling signal, a position of the electrically powered vehicle, and a remaining amount of power stored in the vehicle. When the first determination unit determines that the electrically powered vehicle can participate, the first notification unit causes the notification apparatus to perform first notification processing for inviting the electrically powered vehicle to go to the prescribed participation spot.

15 Claims, 17 Drawing Sheets

(58) Field of Classification Search
CPC ... B60K 2370/592; B60L 58/12; B60L 53/68;
B60L 53/60; B60L 53/62; B60L 53/665;
B60Y 2200/91; Y02T 10/70; Y02T
10/7072; Y02T 10/72; Y02T 90/12; Y02T
90/16; H04W 4/44
See application file for complete search history.

(56) References Cited

U.S. PATENT DOCUMENTS

2020/0215929 A1* 7/2020 Javaid .................. G06Q 20/322
2020/0262307 A1* 8/2020 Rosene .................. H04L 67/52

FOREIGN PATENT DOCUMENTS

| JP | 2012-048286 A |   | 3/2012  |
|----|---------------|---|---------|
| JP | 2012-080748 A |   | 4/2012  |
| JP | 2012080748 A  | * | 4/2012  |
| JP | 2013-041324 A |   | 2/2013  |
| JP | 2014-128140 A |   | 7/2014  |
| JP | 2015-073369 A |   | 4/2015  |
| JP | 2015073369 A  | * | 4/2015  |
| JP | 2015-094695 A |   | 5/2015  |
| JP | 2018-207590 A |   | 12/2018 |
| JP | 2018207590 A  | * | 12/2018 |

OTHER PUBLICATIONS

Machine translation of JP-2012080748-A (Year: 2012).*
Machine translation of JP-2018207590-A (Year: 2018).*
Machine Translation of CN-206412793-U (Year: 2017).*

* cited by examiner

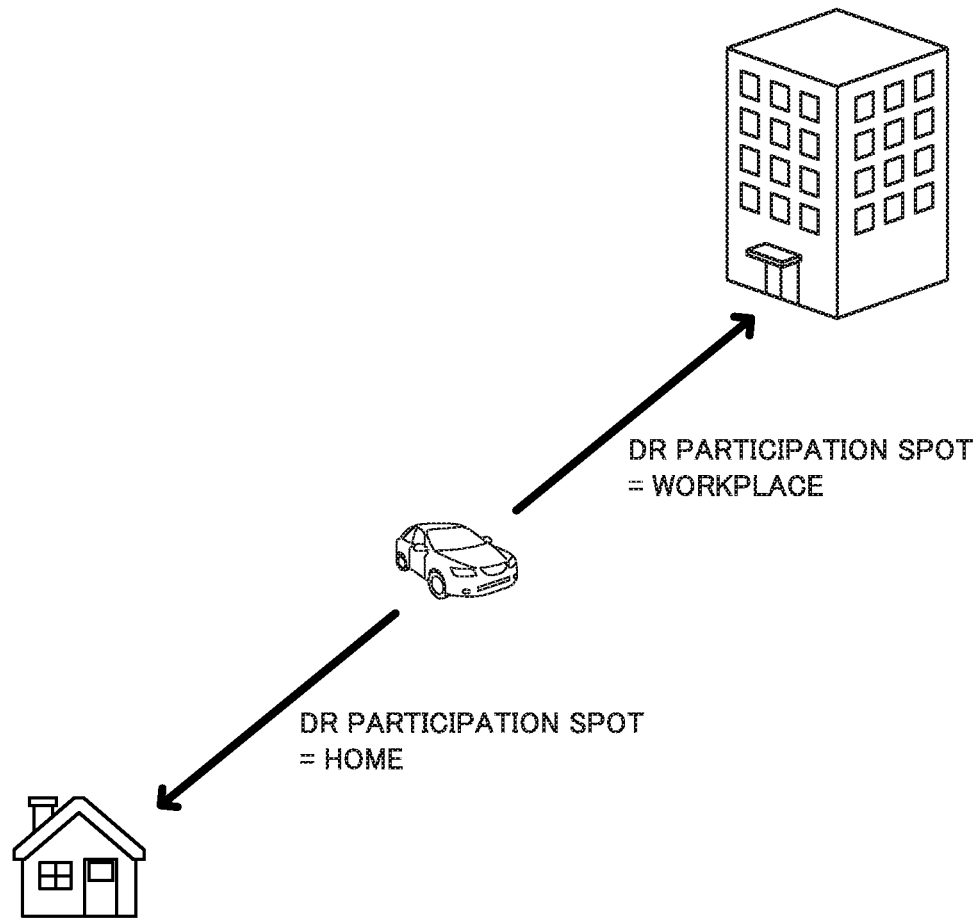

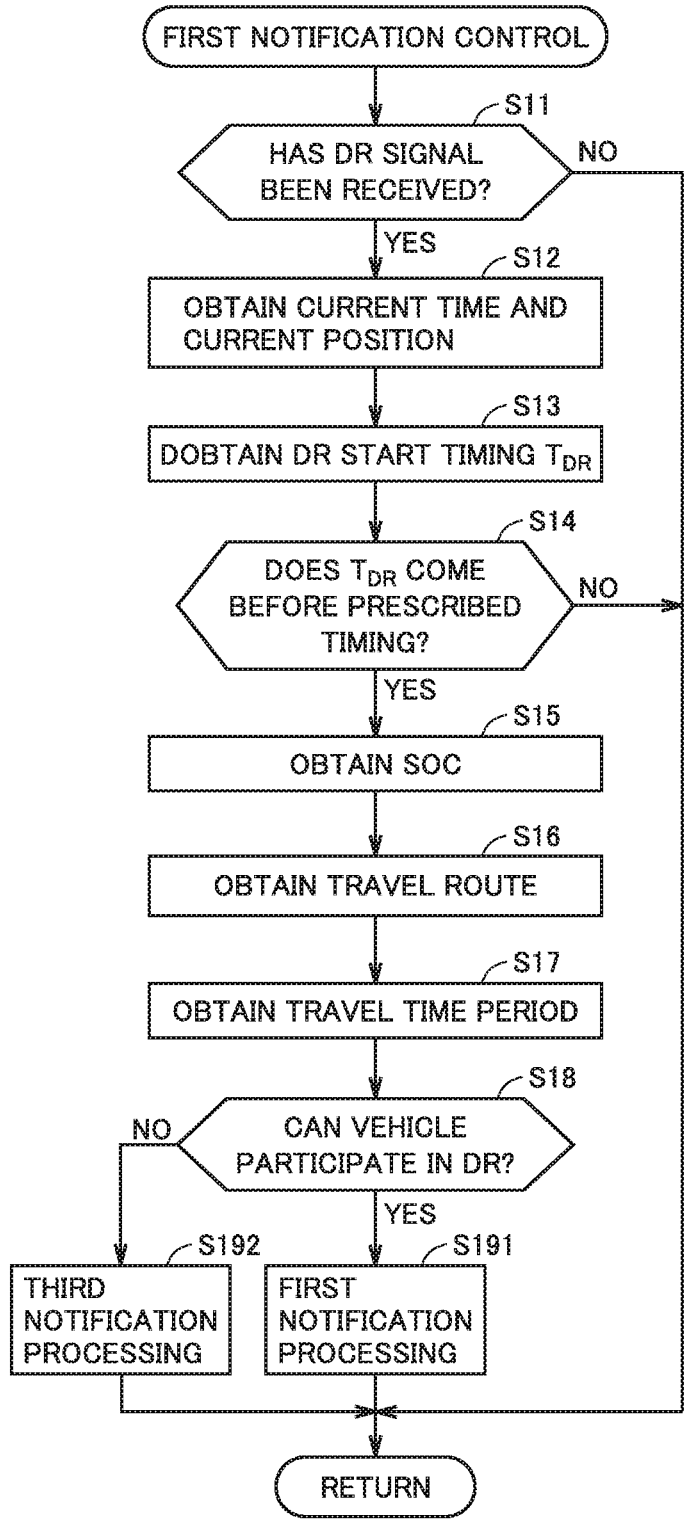

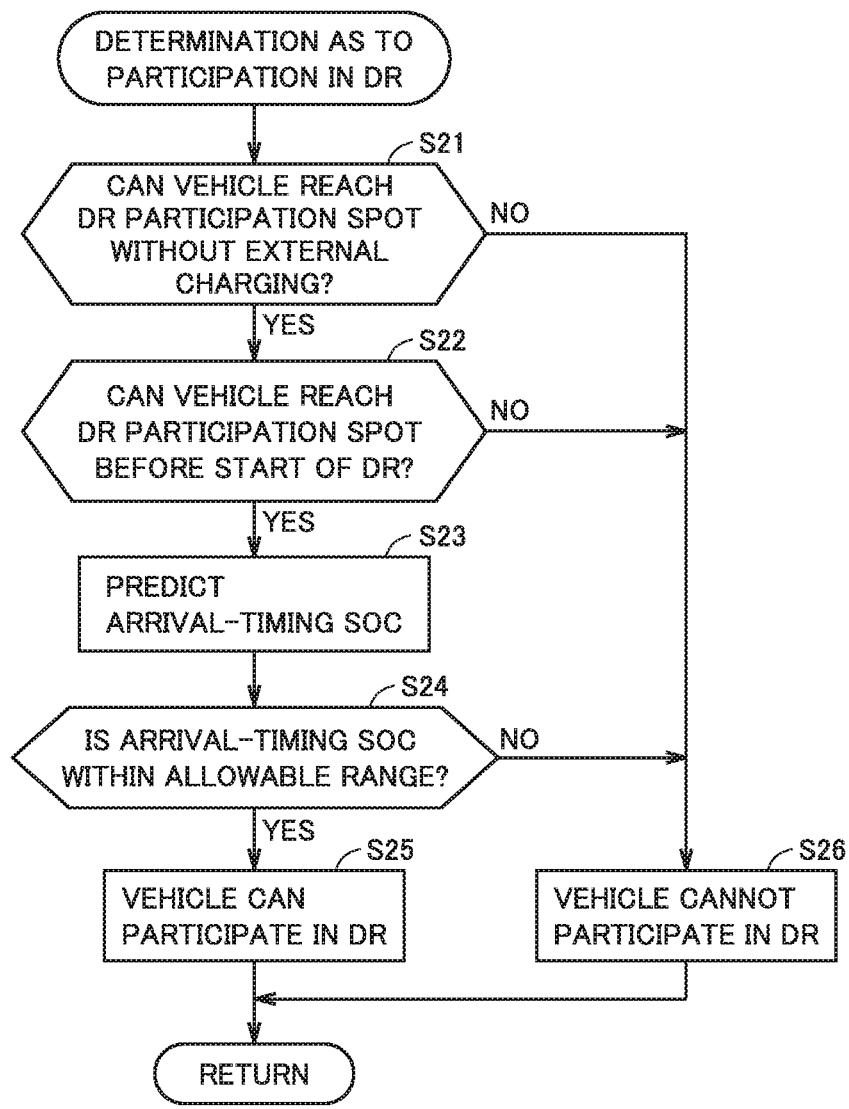

<< SCREEN INVITING VEHICLE TO PARTICIPATE IN DR AT WORKPLACE >>

<< SCREEN INVITING USER TO SUPPRESS POWER CONSUMPTION >>

<< SCREEN THAT GIVES NOTIFICATION THAT VEHICLE CANNOT PARTICIPATE IN DR >>

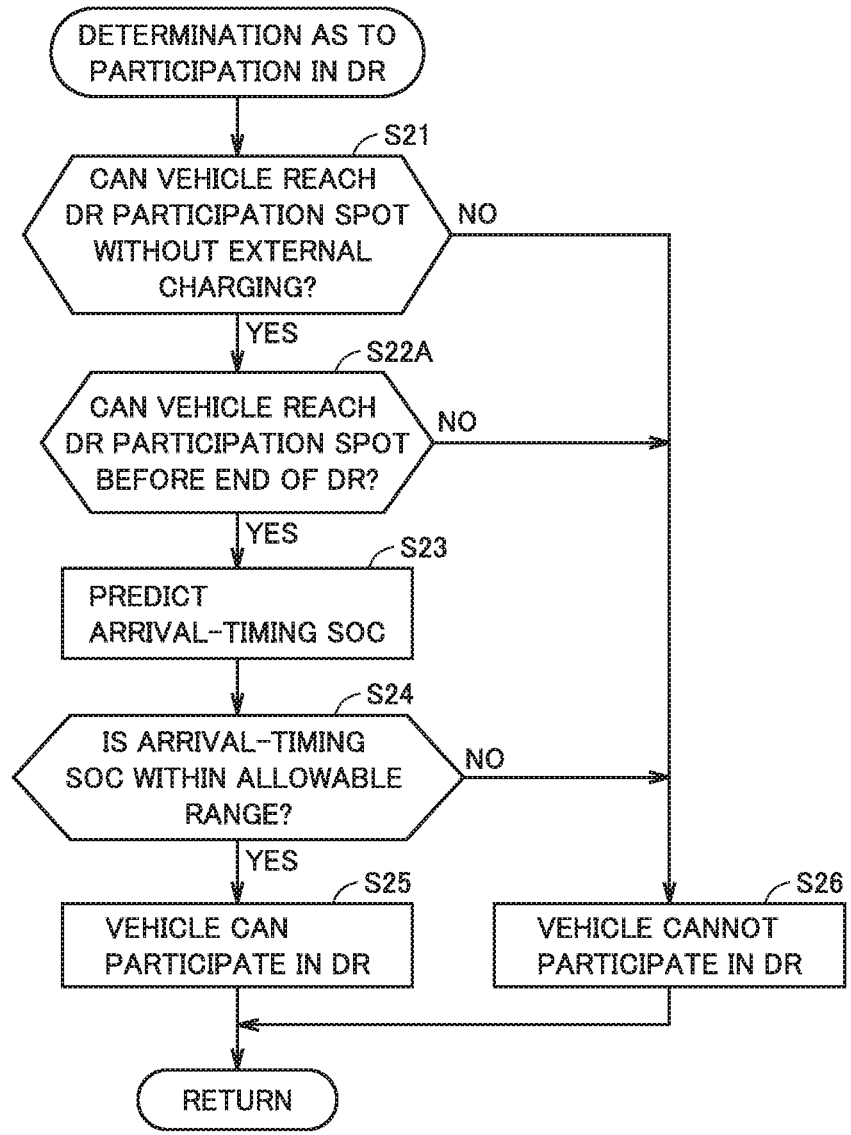

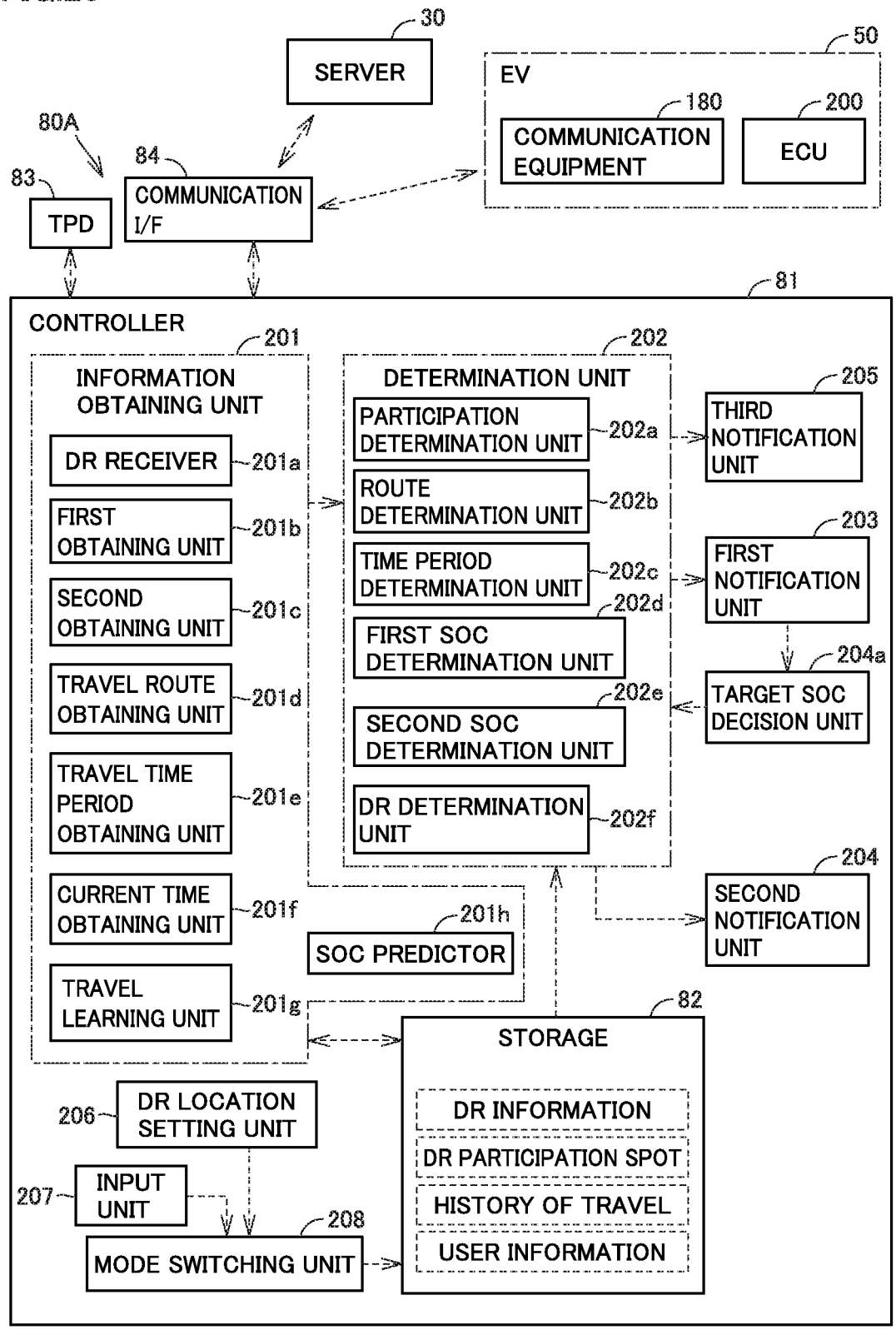

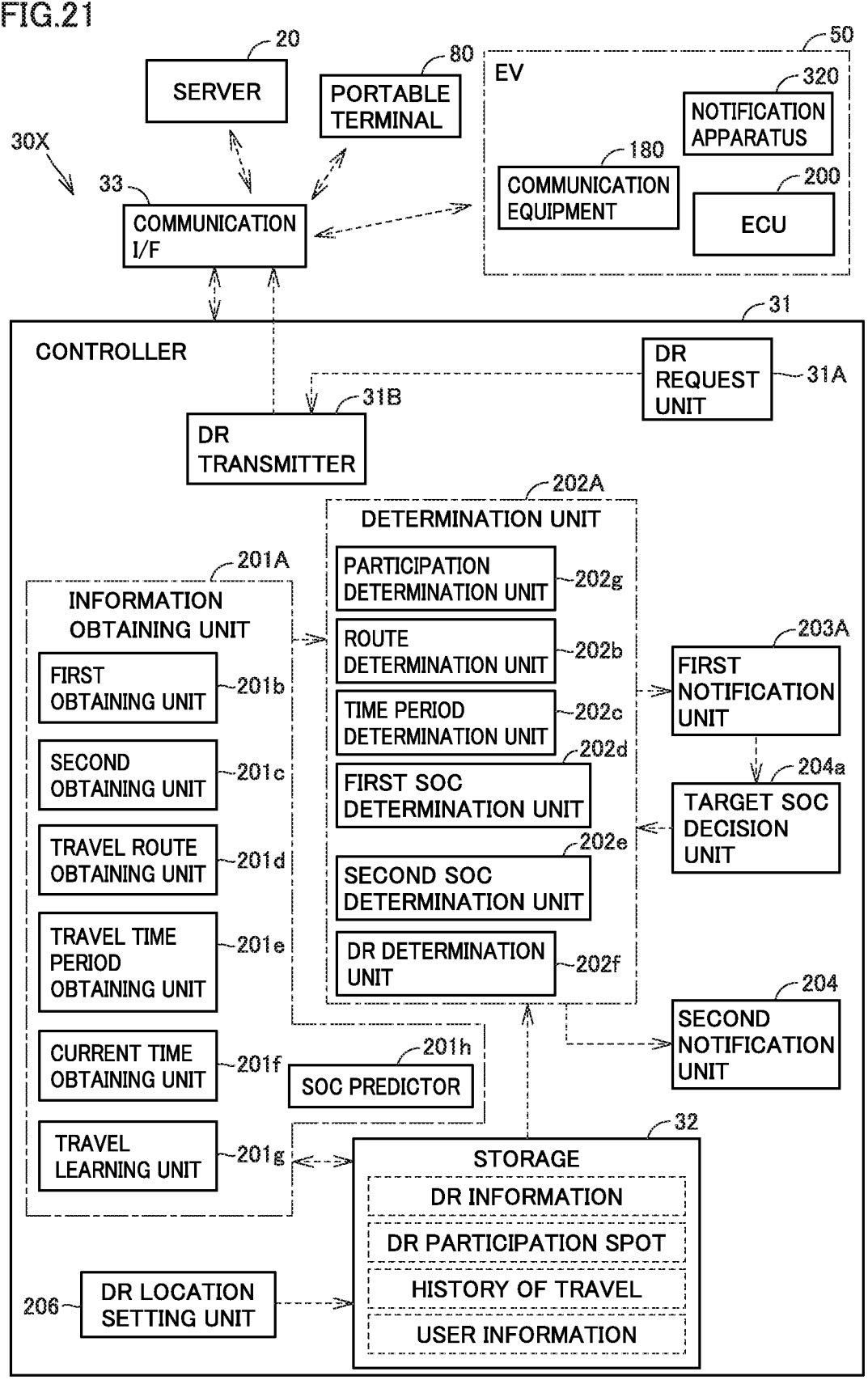

NOTIFICATION CONTROLLER AND ELECTRICALLY POWERED VEHICLE

CROSS REFERENCE TO RELATED APPLICATIONS

This nonprovisional application claims priority to Japanese Patent Application No. 2019-131263 filed with the Japan Patent Office on Jul. 16, 2019, the entire contents of which are hereby incorporated by reference.

BACKGROUND

Field

The present disclosure relates to a notification controller and an electrically powered vehicle.

Description of the Background Art

Japanese Patent Laying-Open No. 2012-048286 discloses a charging monitoring control center that invites participant electric vehicles to be charged, determines a location and an amount of charging of each electric vehicle that has accepted the invitation, and instructs each electric vehicle to travel to the charging location.

SUMMARY

Japanese Patent Laying-Open No. 2012-048286 suggests application of the charging monitoring control center (which is also simply referred to as the "center" below) to demand response (which may be denoted as "DR" below). DR is an approach to adjustment of an amount of power demand by requesting each demand side to suppress or increase power demand by issuing a demand response signal (which is also referred to as a "DR signal" below). The DR signal includes a DR signal that requests suppression of power demand (which is also referred to as a "DR suppression signal" below) and a DR signal that requests increase in power demand (which is also referred to as a "DR increase signal" below).

According to the technique described in Japanese Patent Laying-Open No. 2012-048286, a charging invitation notification (a DR signal) is sent from the center to a vehicle and a driver of the vehicle is notified of a content of invitation. Then, when the driver of the vehicle performs a prescribed operation for application (for example, selects a desired charging location from among candidates designated by the center and presses an "application button"), a signal indicating application by the vehicle is sent to the center. The center that has received this signal determines the location and the amount of charging and instructs the vehicle to travel to the determined charging location. An operation to perform the application operation for participating in DR, however, is bothersome for a user and lowers convenience of the user.

The present disclosure was made to solve the problems above, and an object thereof is to provide a notification controller and an electrically powered vehicle capable of improving convenience of a user (driver) by appropriately giving a notification that invites a driver of an electrically powered vehicle to participate in power leveling.

A notification controller according to a first point of view of the present disclosure controls a notification apparatus that gives a notification to a driver of an electrically powered vehicle including an externally chargeable power storage, and the notification controller includes a receiver, a first obtaining unit, a second obtaining unit, a first determination unit, and a first notification unit. The receiver receives a leveling signal that requests power leveling. The first obtaining unit obtains a position of the electrically powered vehicle. The second obtaining unit obtains a remaining amount of power stored in the power storage (which is also referred to as a "remaining amount of vehicle stored power (RAVSP)" below). When the receiver receives a prescribed leveling signal (which is also referred to as a "target signal" below), the first determination unit determines whether or not the electrically powered vehicle can participate in power leveling at a prescribed participation spot, based on at least one of timing of start and timing of end of power leveling indicated by the target signal, the position of the electrically powered vehicle obtained by the first obtaining unit, and the RAVSP obtained by the second obtaining unit. When the first determination unit determines that the electrically powered vehicle can participate, the first notification unit causes the notification apparatus to perform first notification processing for inviting the electrically powered vehicle to go to the prescribed participation spot.

The prescribed participation spot is set in the notification controller. The participation spot is set, for example, by a manufacturer or a user. In other words, the prescribed participation spot can be determined by a side of the vehicle (a side of the user). A position of a charging facility with which the user is familiar (for example, home or a workplace of the user) can be set as the prescribed participation spot in the notification controller.

When the participation spot is set by the side of the vehicle (the side of the user) as above, however, the vehicle cannot necessarily participate in power leveling, depending on a content of power leveling and a state of the vehicle. Notification processing for inviting the user (driver) to participate in power leveling in spite of the fact that the vehicle is not in condition for participation in power leveling may lower convenience of the user. In the notification controller, whether or not the vehicle can participate in power leveling is determined by the first determination unit, and when the first determination unit determines that the vehicle can participate in power leveling, first notification processing for inviting the driver to participate in power leveling is performed. Therefore, lowering in convenience of the user can be suppressed.

The vehicle is considered to be able to participate in power leveling when the vehicle can reach the participation spot while it is in a power storage state that allows power leveling before end of power leveling (or before start of power leveling). Then, the first determination unit determines whether or not the vehicle can participate in power leveling at the participation spot based on at least one of timing of start and timing of end of power leveling, a position of the vehicle, and an RAVSP. Such a first determination unit can appropriately determine whether or not the vehicle can participate in power leveling.

Thus, according to the notification controller, by appropriately giving a notification to invite the driver of the vehicle to participate in power leveling, convenience of the user can be improved.

The "leveling signal" refers to any signal that requests power leveling, and is not limited to a DR signal with which an electric utility (for example, an electric power utility company or an aggregator) requests power leveling to a demand side. For example, a signal that requests power leveling in power trade between individuals is also encompassed in the "leveling signal." The "electrically powered vehicle" refers to a vehicle that travels with electric power stored in a power storage of the vehicle, and it may be an electric vehicle (EV) or a plug-in hybrid vehicle (PHV). "External charging" refers to charging of a power storage of a vehicle by being supplied with electric power from the outside of the vehicle.

The notification controller may include any of configurations (A) to (D) below. The configurations (A) and (D) may be combined. At least one of the configurations (A) and (D) may be combined with any one of the configurations (B) and (C). The configurations are useful for appropriately determining whether or not a vehicle can participate in power leveling.

(A) The notification controller further includes a travel route obtaining unit and a second determination unit. The travel route obtaining unit obtains a travel route from the position of the electrically powered vehicle obtained by the first obtaining unit to the prescribed participation spot. The second determination unit determines whether or not the electrically powered vehicle can reach the prescribed participation spot by traveling in accordance with the travel route, without increasing the RAVSP by external charging. When the second determination unit determines that the electrically powered vehicle cannot reach the prescribed participation spot, the first determination unit determines that the electrically powered vehicle cannot participate in power leveling.

(B) The notification controller further includes a travel time period obtaining unit and a third determination unit. The travel time period obtaining unit obtains a travel time period required for reaching the prescribed participation spot from the position of the electrically powered vehicle obtained by the first obtaining unit. The third determination unit determines whether or not the electrically powered vehicle can reach the prescribed participation spot before start of power leveling, based on the timing of start of power leveling and the travel time period obtained by the travel time period obtaining unit. When the third determination unit determines that the electrically powered vehicle cannot reach the prescribed participation spot, the first determination unit determines that the electrically powered vehicle cannot participate in power leveling.

(C) The notification controller further includes a travel time period obtaining unit and a fourth determination unit. The travel time period obtaining unit obtains a travel time period required for reaching the prescribed participation spot from the position of the electrically powered vehicle obtained by the first obtaining unit. The fourth determination unit determines whether or not the electrically powered vehicle can reach the prescribed participation spot before end of power leveling, based on the timing of end of power leveling and the travel time period obtained by the travel time period obtaining unit. When the fourth determination unit determines that the electrically powered vehicle cannot reach the prescribed participation spot, the first determination unit determines that the electrically powered vehicle cannot participate in power leveling.

(D) The notification controller further includes a predictor and a fifth determination unit. The predictor predicts the RAVSP at the time of arrival of the electrically powered vehicle at the prescribed participation spot (which is also referred to as an "arrival-timing SOC" below). The fifth determination unit determines whether or not the arrival-timing SOC predicted by the predictor is within a first range. When the fifth determination unit determines that the arrival-timing SOC is out of the first range, the first determination unit determines that the electrically powered vehicle cannot participate in power leveling.

In the configuration (B) or (C), the travel time period obtaining unit may calculate the travel time period based on a history of travel of the electrically powered vehicle. According to such a configuration, as the travel time period obtaining unit takes into account the history of travel of the vehicle, the travel time period tends to more accurately be calculated.

In the configuration (D), the notification controller may further include a decision unit, a sixth determination unit, and a second notification unit. The decision unit may determine a second range narrower than the first range based on a content of power leveling represented by the target signal received by the receiver. When the first determination unit determines that the electrically powered vehicle can participate, the sixth determination unit may determine whether or not the arrival-timing SOC predicted by the predictor is within the second range determined by the decision unit. When the sixth determination unit determines that the arrival-timing SOC is not within the second range, the second notification unit may cause the notification apparatus to perform second notification processing for inviting the driver to modify a condition for travel of the electrically powered vehicle so as to bring the arrival-timing SOC closer to the second range. According to such a configuration, the vehicle tends to reach the participation spot in a power storage state suitable for power leveling.

The prescribed participation spot may be a non-public charging facility. According to such a configuration, the vehicle is more readily participate in power leveling for a long period of time.

The notification controller may further include a setting unit that selects one of a plurality of predetermined locations and sets the selected location as the prescribed participation spot in the notification controller. The setting unit may select one of the plurality of locations based on at least one of the position of the electrically powered vehicle, a direction of travel of the electrically powered vehicle, a travel route of the electrically powered vehicle, and current time. According to such a configuration, an appropriate participation spot can automatically be set so that convenience of a user can be improved.

The notification controller may further include an input unit that accepts input of the prescribed participation spot by a user. According to such a configuration, a user can set any participation spot in the notification controller.

The notification apparatus may include at least one of a meter panel of the electrically powered vehicle, a car navigation system mounted on the electrically powered vehicle, a display provided on a windshield of the electrically powered vehicle, a smart speaker mounted on the electrically powered vehicle, an indicator that gives a notification by a state of illumination in the electrically powered vehicle, and a portable terminal. Such a notification apparatus can give information in a manner readily recognizable by a user who is driving the vehicle.

The prescribed leveling signal (target signal) may be the leveling signal in response to which power leveling is started before prescribed timing. According to such a configuration, the target signal is limited to the leveling signal in response to which power leveling is started before prescribed timing close to current time so that a notification unnecessary for a user is less likely to be given and convenience of the user can be improved.

An electrically powered vehicle according to a second point of view of the present disclosure includes any notification controller described above. According to such an electrically powered vehicle, when the electrically powered vehicle receives a target signal, a notification that invites a driver to participate in power leveling is appropriately given so that convenience of a user can be improved.

A notification controller according to a third point of view of the present disclosure controls a notification apparatus that gives a notification to a driver of an electrically powered vehicle including an externally chargeable power storage, and the notification controller includes a transmitter, a first obtaining unit, a second obtaining unit, a determination unit, and a notification unit. The transmitter transmits a leveling signal that requests power leveling to the electrically powered vehicle. The first obtaining unit obtains a position of the electrically powered vehicle. The second obtaining unit obtains an RAVSP (that is, a remaining amount of power stored in the power storage). The determination unit determines whether or not the electrically powered vehicle can participate in power leveling at a prescribed participation spot, based on at least one of timing of start and timing of end of power leveling, the position of the electrically powered vehicle obtained by the first obtaining unit, and the RAVSP obtained by the second obtaining unit. When the determination unit determines that the electrically powered vehicle can participate, the transmitter transmits the leveling signal to the electrically powered vehicle. When the transmitter transmits a prescribed leveling signal (target signal) to the electrically powered vehicle, the notification unit causes the notification apparatus to perform notification processing for inviting the electrically powered vehicle to go to the prescribed participation spot.

The notification controller includes the transmitter instead of the receiver. The notification controller may be mounted, for example, on an aggregator server. The notification controller also appropriately gives a notification to invite a driver of the vehicle to participate in power leveling so that convenience of a user can be improved.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 9 is a diagram for illustrating a first modification of the automatic setting mode.

FIG. 10 is a diagram for illustrating a second modification of the automatic setting mode.

FIG. 11 is a flowchart showing processing involved with first notification control performed by the controller of the vehicle according to the first embodiment of the present disclosure.

FIG. 12 is a flowchart showing details of determination as to participation in DR made in the processing in FIG. 11.

FIG. 19 is a diagram showing a modification of processing shown in FIG. 12.

FIG. 20 is a diagram showing a portable terminal on which a notification controller according to a second embodiment of the present disclosure is mounted.

FIG. 21 is a diagram showing an aggregator server on which a notification controller according to a third embodiment of the present disclosure is mounted.

DETAILED DESCRIPTION

Figure 1:
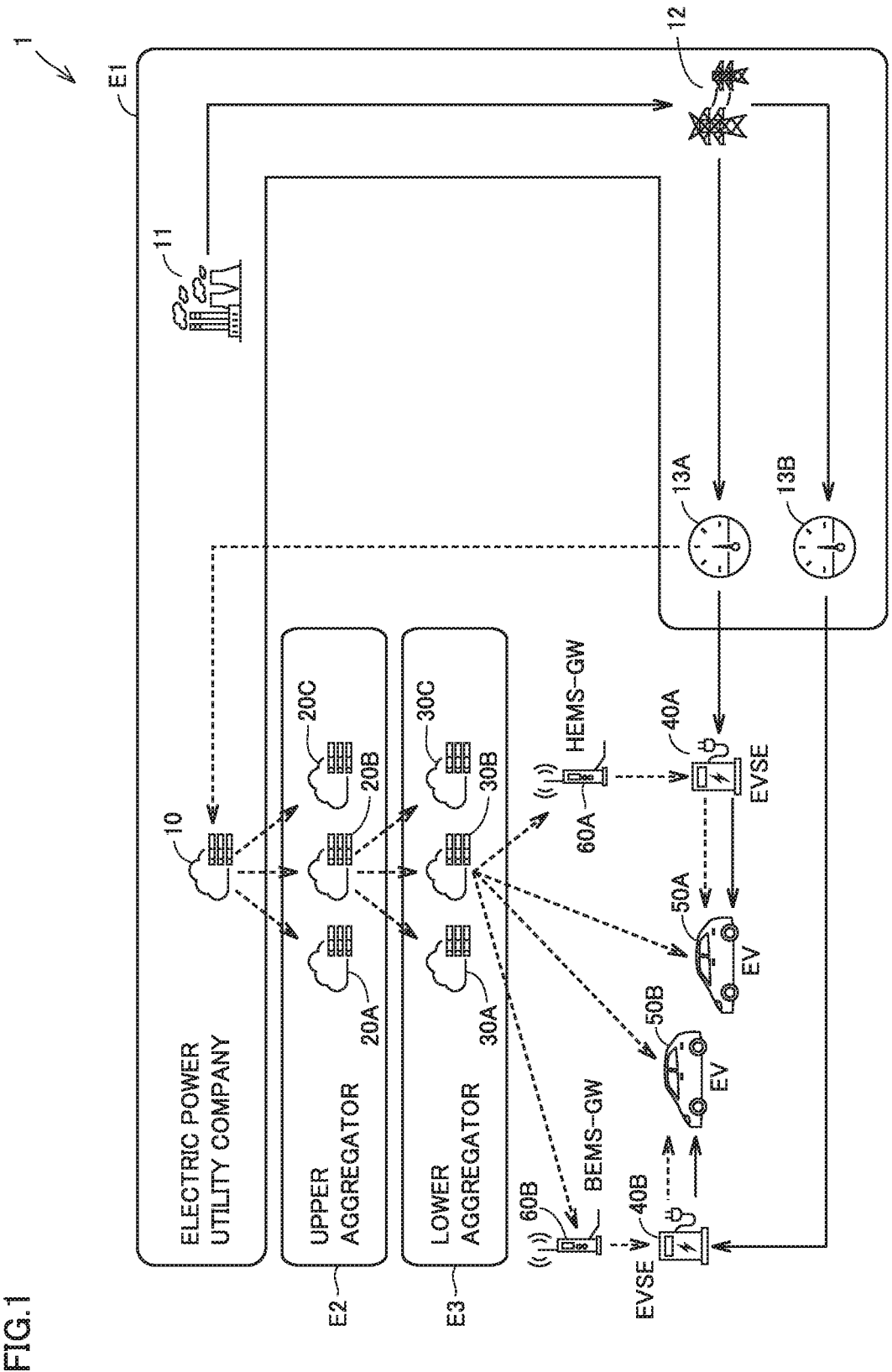
FIG. 1 is a diagram showing a configuration of a VGI system according to a first embodiment of the present disclosure.

An embodiment of the present disclosure will be described in detail below with reference to the drawings. The same or corresponding elements in the drawings have the same reference characters allotted and description thereof will not be repeated.

An electric power system dependent on a large-scale power plant (an intensive energy resource) possessed by an electric power utility company has recently been reviewed and a scheme for utilizing an energy resource possessed by each demand side (which is also referred to as "demand side resources (DSR)" below) has been constructed. The DSR functions as distributed energy resources (which are also referred to as "DER" below).

A virtual power plant (VPP) has been proposed as a scheme for utilizing the DSR for an electric power system. The VPP refers to a scheme in which a large number of DER (for example, DSR) are put together according to a sophisticated energy management technology that makes use of the Internet of Things (IoT) and the DER are remotely controlled as being integrated as if the DER functioned as a single power plant. In the VPP, an electric utility that puts the DER together to provide an energy management service is referred to as an "aggregator." An electric power utility company, for example, in coordination with an aggregator, can balance between supply and demand of electric power based on demand response (DR).

First Embodiment

In a vehicle grid integration (VGI) system according to this embodiment, a vehicle including a power storage (more specifically, an electric vehicle) is adopted as DSR for implementing the VPP.

FIG. 1 is a diagram showing a configuration of a VGI system according to a first embodiment. Referring to FIG. 1, a VGI system 1 includes an electric power utility company E1, an upper aggregator E2, and a lower aggregator E3.

Electric power utility company E1 generates and supplies electric power. Electric power utility company E1 can make a profit, for example, by dealing with a demand side (for example, an individual or a company) that uses electric power. Electric power utility company E1 maintains and manages a server 10, a power plant 11, a power transmission and distribution facility 12, and smart meters 13A and 13B.

Power plant 11 includes a power generator that generates electricity and supplies electric power generated by the power generator to power transmission and distribution facility 12. Any system for power generation by power plant 11 is applicable, and for example, any of thermal power generation, hydroelectric power generation, wind power generation, nuclear power generation, and solar photovoltaic power generation may be applicable. Power transmission and distribution facility 12 includes a power line, a substation, and an electricity distribution line and transmits and distributes electric power supplied from power plant 11. Power plant 11 and power transmission and distribution facility 12 construct a power grid (power system).

Each of smart meters 13A and 13B measures an amount of power usage each time a prescribed time period elapses (for example, each time thirty minutes elapse), stores the measured amount of power usage, and transmits the measured amount of power usage to server 10. For example, IEC (DLMS/COSEM) can be adopted as a protocol for communication between smart meters 13A and 13B and server 10. Each of smart meters 13A and 13B measures an amount of power usage in EVSE 40A and 40B which will be described later (for example, an amount of electric power used for charging of EVs 50A and 50B). Each of EVSE 40A and EVSE 40B according to this embodiment corresponds to an exemplary "charging facility" according to the present disclosure.

Each utility (which is also referred to as a "parent AG" below) belonging to upper aggregator E2 manages a plurality of utilities (each of which is also referred to as a "child AG" below) belonging to lower aggregator E3 and provides an energy management service by putting together amounts of electric power controlled by children AGs under the control thereof. The parent AG can make a profit, for example, by dealing with electric power utility company E1.

Server 10 manages information on a plurality of parent AGs (for example, parent AGs registered in server 10) under the control thereof. Identification information (ID) for identification of a parent AG is provided for each parent AG. Server 10 manages information for each parent AG as being distinguished based on an ID of the parent AG. The parent AG may procure capability (capacity) of supply of electricity not only from an electric vehicle (EV) but also from a resource other than the EV (for example, biomass). Upper aggregator E2 includes a plurality of servers (for example, servers 20A to 20C) provided for respective parent AGs. The server included in upper aggregator E2 is denoted as a "server 20" except for an example in which the servers are described as being distinguished from one another. Though FIG. 1 shows three servers 20 (servers 20A to 20C), any number of servers 20 may be included in upper aggregator E2 and ten or more servers may be included.

Each server 20 included in upper aggregator E2 manages information on children AGs (for example, children AGs registered in server 20) under the control thereof. Each utility (child AG) belonging to lower aggregator E3 controls an amount of electric power by requesting each demand side to suppress or increase power demand by issuing a demand response signal (DR signal). Identification information (ID) for identification of a child AG is provided for each child AG. Server 20 manages information for child AG as being distinguished based on an ID of the child AG. Lower aggregator E3 includes a plurality of servers (for example, servers 30A to 30C) provided for respective children AGs. The server included in lower aggregator E3 is denoted as a "server 30" below except for an example in which the servers are described as being distinguished from one another. Servers 30A to 30C shown in FIG. 1 are managed by common server 20 (for example, server 20B). Any number of servers 30 may be managed by each server 20 included in upper aggregator E2, and ten or more servers may be managed.

An electric vehicle (EV) is adopted as the DSR managed by a child AG (or server 30) in VGI system 1 shown in FIG. 1. The EV can be supplied with electric power by electric vehicle supply equipment (EVSE). In this embodiment, VGI system 1 includes both of EVSE adapted to an alternating-current electric power supply type (an AC type) and EVSE adapted to a direct-current electric power supply type (a DC type). Without being limited as such, VGI system 1 may include any one of EVSE of the AC type and EVSE of the DC type. Though non-public EVSE included in VGI system 1 is mainly described in this embodiment, VGI system 1 may include public EVSE.

EVSE 40A included in VGI system 1 shown in FIG. 1 is installed in a house. The EVSE installed in the house can be managed by a home energy management system-gateway (HEMS-GW). In this embodiment, EVSE 40A is installed in a user's house and managed by HEMS-GW 60A. EVSE 40A is a non-public charging facility used only by a user and a family member of the user.

EVSE 40B included in VGI system 1 shown in FIG. 1 is installed in a building. The EVSE installed in the building can be managed by a building energy management system-gateway (BEMS-GW). In this embodiment, EVSE 40B is installed in a building which is a workplace of a user and managed by BEMS-GW 60B. EVSE 40B is a non-public charging facility used only by workers in the building.

VGI system 1 includes a plurality of pieces of EVSE, a plurality of EVs, a plurality of HEMS-GWs, and a plurality of BEMS-GWs (only one of each of them being shown in FIG. 1). Any independent number of pieces of EVSE, EVs, HEMS-GWs, and BEMS-GWs may be included in VGI system 1, and the number may be set to ten or more or one hundred or more. Each piece of EVSE and each EV included in VGI system 1 are denoted as "EVSE 40" and an "EV 50," respectively, except for an example in which each of them is described as being distinguished. Each EV 50 included in VGI system 1 may be a personally owned vehicle (which is also referred to as a "POV" below) or a vehicle managed by a mobility as a service (MaaS) entity (which is also referred to as a "MaaS vehicle" below).

Each server 30 included in lower aggregator E3 manages information on a plurality of EVs 50 (for example, EVs registered in server 30) under the control thereof. Identification information for identification of EV 50 (which is also referred to as a "vehicle ID" below) is provided for each EV 50. Server 30 manages information for each EV 50 as being distinguished based on the vehicle ID. Each server 30 included in lower aggregator E3 can communicate with each HEMS-GW 60A and each BEMS-GW 60B (for example, a HEMS-GW and a BEMS-GW registered in server 30) under the control thereof.

EVSE 40A is connected to the power grid of electric power utility company E1 with smart meter 13A being interposed. An amount of power usage in EVSE 40A is measured by smart meter 13A and transmitted to server 10. EVSE 40B is connected to the power grid of electric power utility company E1 with smart meter 13B being interposed. An amount of power usage in EVSE 40B is measured by smart meter 13B and transmitted to server 10. Each of smart meters 13A and 13B included in VGI system 1 is denoted as a "smart meter 13" below except for an example in which the smart meters are described as being distinguished from each other.

Smart meter 13 is provided for each piece of EVSE 40 included in VGI system 1. Each piece of EVSE 40 included in VGI system 1 is managed by electric power utility company E1 and connected to the power grid provided by electric power utility company E1. Each piece of EVSE 40 included in VGI system 1 is supplied with electric power from electric power utility company E1. In VGI system 1, identification information for identification of EVSE 40 (which is also referred to as a "facility ID" below) is provided for each piece of EVSE 40, and server 10 manages an amount of power usage in each piece of EVSE 40 as being distinguished based on the facility ID. Electric power utility company E1 monitors an amount of electric power used in each piece of EVSE 40 included in VGI system 1 (that is, an amount of supply of electric power to a demand side) through smart meter 13 and provides electric power to the demand side through each piece of EVSE 40 included in VGI system 1. Smart meter 13 provided in a charging facility adapted to backfeeding (that is, a charging and discharging facility) measures an amount of backfed electric power in addition to an amount of power usage.

Figure 2:
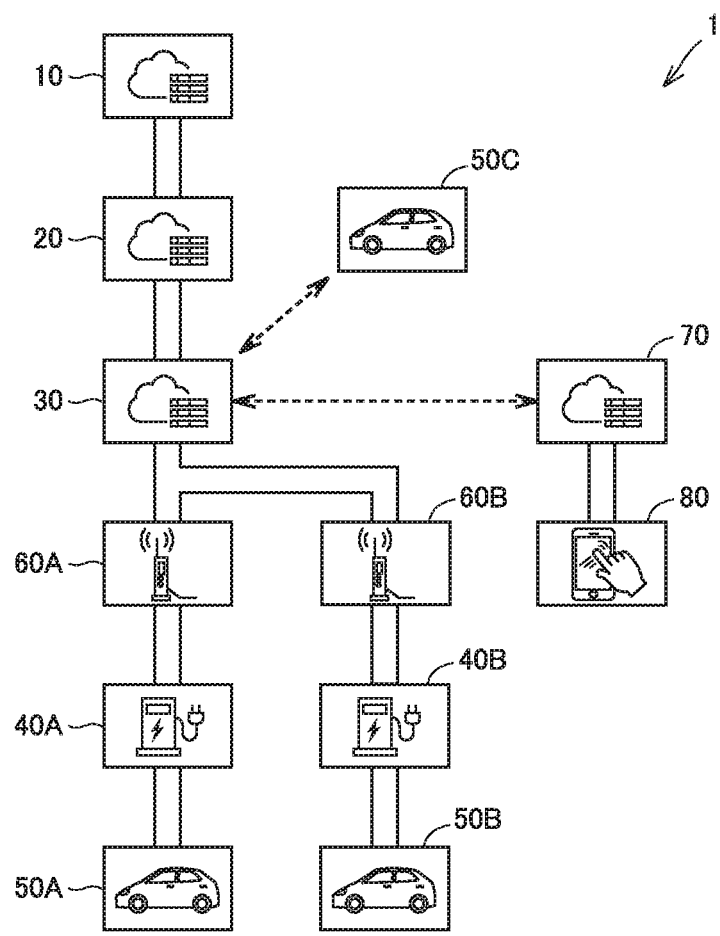
FIG. 2 is a diagram of a communication system of the VGI system shown in FIG. 1.

A function of each element included in VGI system 1 will be described below with reference to FIGS. 1 and 2. FIG. 2 is a diagram of a communication system of VGI system 1. In FIGS. 1 and 2, EV 50A is electrically connected to EVSE 40A through a charging cable. EV 50B is electrically connected to EVSE 40B through a charging cable. An EV 50C is traveling in FIG. 2.

Referring to FIG. 2 together with FIG. 1, in VGI system 1, server 10 and server 20 can communicate with each other. Server 20 and server 30 can also communicate with each other. Though communication between servers 10 and 20 and between servers 20 and 30 may be independently of any type, for example, a virtual private network (VPN) may be adopted.

Server 30 can communicate with each of each EV 50 (that is, EV 50A to 50C), HEMS-GW 60A, and BEMS-GW 60B. Server 30, HEMS-GW 60A, and BEMS-GW 60B communicate with each other, for example, through the Internet. Server 30 and each EV 50 wirelessly communicate with each other, for example, through a mobile communication network (telematics).

HEMS-GW 60A and EVSE 40A can communicate with each other. BEMS-GW 60B and EVSE 40B can also communicate with each other. Though communication between HEMS-GW 60A and EVSE 40A and between BEMS-GW 60B and EVSE 40B may be independently of any type, for example, a local area network (LAN) may be adopted. The LAN may be wired or wireless LAN.

EVSE 40A and EV 50A communicate with each other through a charging cable. EVSE 40B and EV 50B communicate with each other also through a charging cable.

Communication between EVSE 40A and EV 50A and between EVSE 40B and EV 50B may be independently of any type, and controller area network (CAN) or power line communication (PLC) may be adopted.

VGI system 1 further includes a data center 70 and a portable terminal 80 registered in data center 70. Data center 70 includes, for example, a server (not shown) that manages information. In this embodiment, a smartphone equipped with a touch panel display is adopted as portable terminal 80. Without being limited thereto, any portable terminal can be adopted as portable terminal 80, and for example, a tablet terminal, a portable game console, and a wearable device such as a smart watch can also be adopted.

Data center 70 communicates with server 30, for example, through the Internet. Data center 70 manages information on a plurality of registered portable terminals 80. Information on portable terminal 80 includes not only information on the terminal itself (for example, a communication address of portable terminal 80) but also information on a user who carries portable terminal 80 (for example, a vehicle ID of EV 50 belonging to the user). Identification information for identification of portable terminal 80 (which is also referred to as a "terminal ID" below) is provided for each portable terminal 80 and data center 70 manages information for each portable terminal 80 as being distinguished based on the terminal ID. The terminal ID also functions as information for identification of a user (a user ID). Though FIG. 2 shows only a single portable terminal 80, each user carries portable terminal 80.

Prescribed application software (which is simply referred to as an "application" below) is installed in portable terminal 80, and portable terminal 80 exchanges information with each of HEMS-GW 60A, BEMS-GW 60B, and data center 70 through the application. Portable terminal 80 wirelessly communicates with each of HEMS-GW 60A, BEMS-GW 60B, and data center 70, for example, through the Internet.

Server 10 balances between supply and demand of electric power by using demand response (DR). When server 10 makes such adjustment, initially, it transmits a signal (which is also referred to as a "DR participation request" below) requesting each server 20 (for example, servers 20A to 20C shown in FIG. 1) included in upper aggregator E2 to participate in DR. The DR participation request includes a region of interest of DR, a type of DR (for example, DR suppression or DR increase), and a DR period.

When server 20 receives a DR participation request from server 10, it calculates an adjustable DR amount (that is, an amount of electric power that can be adjusted in accordance with DR) and transmits the amount to server 10. Server 20 can calculate the adjustable DR amount, for example, based on a total of DR capacities of children AGs (that is, a capacity with which the children AGs can address DR) under the control thereof. Server 20 can obtain the DR capacity of each child AG under the control thereof, for example, by making an inquiry to server 30. Server 10 determines a DR amount (that is, an amount of power adjustment asked to a parent AG) for each parent AG based on the adjustable DR amount received from each server 20 included in upper aggregator E2 and transmits a signal (which is also referred to as a "first DR execution instruction" below) instructing server 20 of each parent AG to execute DR. The first DR execution instruction includes a region of interest of DR, a type of DR (for example, DR suppression or DR increase), a DR amount for the parent AG, and a DR period.

Server 30 sequentially obtains from each EV 50, information (for example, a position of a vehicle, a remaining capacity of a battery, a travel schedule, and a travel condition) representing a state of each EV 50 under the control thereof and stores the information. As a result of accumulation of such data, a history of charging and discharging and a history of travel of each EV 50 under the control are stored in server 30. Server 30 sequentially obtains from each HEMS-GW 60A connected to each piece of EVSE 40A, information representing a state (for example, information indicating whether or not the vehicle is being charged, a schedule for charging, and a condition for charging) of each piece of EVSE 40A under the control thereof and stores the information. Furthermore, server 30 sequentially obtains from each BEMS-GW 60B connected to each piece of EVSE 40B, information representing a state (for example, information indicating whether or not the vehicle is being charged, a schedule for charging, and a condition for charging) of each piece of EVSE 40B under the control thereof and stores the information. As a result of accumulation of such data, a history of charging and a history of backfeeding of each piece of EVSE 40 under the control are stored in server 30.

A user can transmit information representing a state and a schedule of the user to data center 70 by operating portable terminal 80. Exemplary information representing a state of the user includes information indicating whether or not the user is in a condition of being ready for addressing DR. Exemplary information representing the schedule of the user includes time of departure of a POV from home or a drive plan of a MaaS vehicle. Data center 70 stores the information received from portable terminal 80 as being distinguished for each terminal ID. Server 30 can obtain information on the user from data center 70.

When server 30 receives the previously-described inquiry from server 20, server 30 calculates the DR capacity of a child AG corresponding thereto based on information on each of EV 50, EVSE 40, and the user described above, and transmits the DR capacity to server 20. When server 20 receives the previously-described first DR execution instruction from server 10, server 20 determines a DR amount for each child AG (that is, an amount of electric power of which adjustment is asked to the child AG) based on the DR capacity received from each server 30 included in lower aggregator E3 and transmits a signal (which is also referred to as a "second DR execution instruction" below) that instructs server 30 of each child AG to execute DR. The second DR execution instruction includes a region of interest of DR, a type of DR (for example, DR suppression or DR increase), a DR amount for the child AG, and a DR period.

When server 30 receives the second DR execution instruction, it allocates the DR amount to each EV 50 that can address DR among EVs 50 under the control thereof, generates a DR signal for each EV 50, and transmits the DR signal to each EV 50. The DR signal includes a type of DR (for example, DR suppression or DR increase), a DR amount for EV 50, and a DR period. A DR amount in DR increase requested to EV 50 during the DR period may be, for example, charging power during the DR period or an amount of charging during the DR period (that is, a time integrated value of charging power). A DR amount in DR suppression requested to EV 50 during the DR period may be, for example, an amount of discharging during the DR period (that is, a time integrated value of discharging power) or a guard value for restriction of charging power (an upper limit value of charging power) during the DR period.

When the user of each EV 50 included in VGI system 1 receives the DR signal, the user can contribute to adjustment of an amount of power demand by performing charging or discharging in accordance with DR by using a charging facility managed by electric power utility company E1 (that is, any of a plurality of pieces of EVSE 40 included in VGI system 1).

Figure 3:
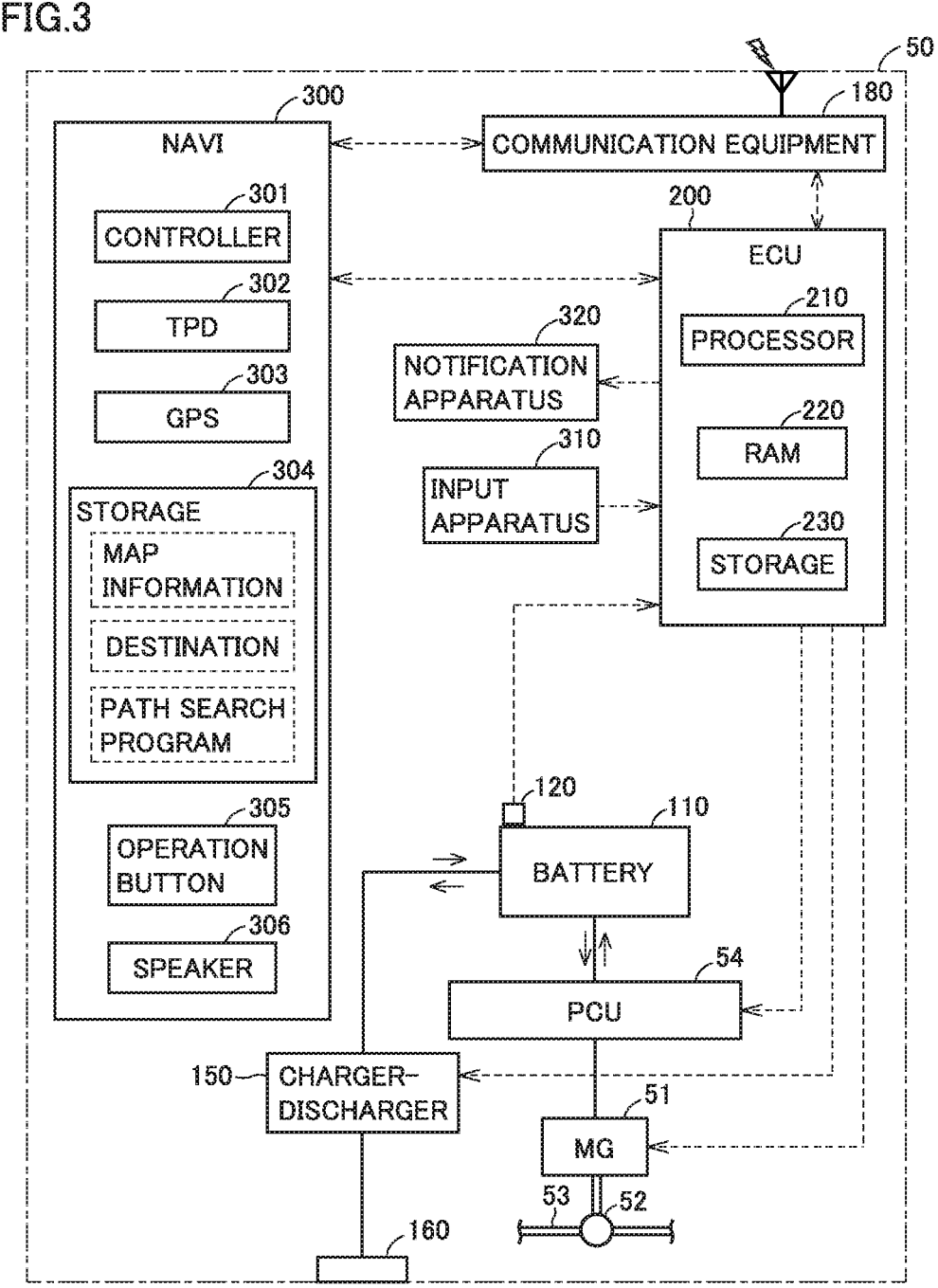
FIG. 3 is a diagram showing a configuration of a vehicle on which a notification controller according to the first embodiment of the present disclosure is mounted.

FIG. 3 is a diagram showing a configuration of EV 50. Referring to FIG. 3 together with FIGS. 1 and 2, EV 50 includes a motor generator (which is referred to as an "MG" below) 51, a motive power transmission gear 52, a driveshaft 53, a power control unit (which is referred to as a "PCU" below) 54, a battery 110, a monitoring module 120, a charger-discharger 150, an inlet 160, communication equipment 180, an electronic control unit (which is referred to as an "ECU" below) 200, a car navigation system (which is also referred to as a "NAVI system" below) 300, an input apparatus 310, and a notification apparatus 320. ECU 200 controls charging and discharging of battery 100. EV 50, battery 110, and ECU 200 according to this embodiment correspond to an exemplary "electrically powered vehicle," an exemplary "power storage," and an exemplary "notification controller" according to the present disclosure, respectively.

Battery 110 stores electric power for traveling. Battery 110 includes, for example, a secondary battery such as a lithium ion battery or a nickel metal hydride battery. The secondary battery may be a cell or a battery assembly. Instead of the secondary battery, another power storage such as an electric double layer capacitor may be adopted.

Inlet 160 receives electric power supplied from the outside of EV 50. Charger-discharger 150 is located between inlet 160 and battery 110. Charger-discharger 150 includes a relay that switches between connection and disconnection of an electric power path from inlet 160 to battery 110 and a power conversion circuit (neither of which is shown). For example, a bidirectional converter may be adopted as the power conversion circuit. Each of the relay and the power conversion circuit included in charger-discharger 150 is controlled by ECU 200.

A connector of a charging cable can be connected to inlet 160. As EVSE 40 outside EV 50 and inlet 160 are connected to each other through the charging cable, electric power can be supplied and received between EVSE 40 and EV 50. For example, electric power can be supplied from the outside of EV 50 to charge battery 110 of EV 50 (that is, external charging). Electric power for external charging is supplied, for example, from EVSE 40 through the charging cable to inlet 160. Charger-discharger 150 converts electric power received at inlet 160 into electric power suitable for charging of battery 110 and outputs resultant electric power to battery 110. As EVSE 40 and inlet 160 are connected to each other through the charging cable, electric power can be fed (and battery 110 can be discharged) from EV 50 through the charging cable to EVSE 40. Electric power for power feed to the outside of EV 50 (which is also referred to as "external power feed" below) is supplied from battery 110 to charger-discharger 150. Charger-discharger 150 converts electric power supplied from battery 110 into electric power suitable for external power feed and outputs resultant electric power to inlet 160. When any of external charging and external power feed is performed, the relay of charger-discharger 150 is closed (connected), and when neither of external charging and external power feed is performed, the relay of charger-discharger 150 is opened (disconnected).

Charger-discharger 150 and inlet 160 may be a charger-discharger and an inlet adapted to the AC type or may be a charger-discharger and an inlet adapted to the DC type. EV 50 may include a plurality of types of chargers-dischargers and inlets so as to adapt to a plurality of types (for example, both of the AC type and the DC type).

The configuration of charger-discharger 150 is not limited as above and can be modified as appropriate. Charger-discharger 150 may include at least one of a rectification circuit, a power factor correction circuit, an insulating circuit (for example, an insulating transformer), an inverter, and a filter circuit.

MG 51 is implemented, for example, by a three-phase AC motor generator. MG 51 is driven by PCU 54 and generates driving force for traveling of EV 50. PCU 54 includes, for example, a controller including a processor, an inverter, and a converter (none of which is shown). The controller of PCU 54 receives an instruction (a control signal) from ECU 200 and controls the inverter and the converter of PCU 54 in accordance with the instruction. PCU 54 further includes a not-shown relay (which is referred to as an "SMR" below). The SMR switches between connection and disconnection of an electric power path from battery 110 to PCU 54. A state of the SMR (connection and disconnection) is controlled by ECU 200. The SMR is closed (connected) when the vehicle travels.

MG 51 is mechanically connected to driveshaft 53 with motive power transmission gear 52 serving as a reduction gear being interposed. Drive wheels (not shown) of EV 50 are attached to respective opposing ends of driveshaft 53 and rotate integrally with driveshaft 53. MG 51 is driven by electric power supplied from battery 110 through the inverter and the converter of PCU 54 and enters a power running state. MG 51 in the power running state rotates driveshaft 53 (and the drive wheels of EV 50). MG 51 performs regeneration and supplies regenerated electric power to battery 110. EV 50 may be of any drive type, and for example, the EV may be a front-wheel-drive vehicle or a four-wheel-drive vehicle. Though FIG. 3 shows a configuration in which only a single MG is provided, the number of MGs is not limited as such and a plurality of (for example, two) MGs may be provided.

Monitoring module 120 includes various sensors that detect a state (for example, a temperature, a current, and a voltage) of battery 110 and outputs a result of detection to ECU 200. ECU 200 can obtain a state (for example, a temperature, a current, a voltage, a state of charge (SOC), and an internal resistance) of battery 110 based on an output (that is, detection values from various sensors) from monitoring module 120. The SOC represents a remaining amount of power storage, and it is expressed, for example, as a ratio of a current amount of stored power to an amount of stored power in a fully charged state that ranges from 0 to 100%.

Communication equipment 180 includes a communication interface (I/F) for communication with each of server 30, EVSE 40, and portable terminal 80. Communication equipment 180 is registered in server 30. Communication equipment 180 may further include a communication I/F for communication with each of HEMS-GW 60A, BEMS-GW 60B, and data center 70.

ECU 200 includes a processor 210, a random access memory (RAM) 220, and a storage 230. For example, a central processing unit (CPU) can be adopted as processor 210. RAM 220 functions as a work memory that temporarily stores data to be processed by processor 210. Storage 230 can store information that is put thereinto. Storage 230 includes, for example, a read only memory (ROM) and a rewritable non-volatile memory. Storage 230 stores not only a program but also information (for example, a map, a mathematical expression, and various parameters) to be used by a program. ECU 200 communicates with equipment (for example, server 30, EVSE 40, and portable terminal 80) outside EV 50 through communication equipment 180. Any number of processors may be provided in ECU 200 and a processor may be prepared for each prescribed type of control.

NAVI system 300 includes a controller 301, a touch panel display (which is also referred to as a "TPD" below) 302, a global positioning system (GPS) module 303, a storage 304, an operation button 305, and a speaker 306. Controller 301 includes a processor and a RAM (neither of which is shown). For example, at least one of a hard disk drive and a solid state drive (SSD) can be adopted as storage 304. Storage 304 stores map information and a path search program. In this embodiment, a smart speaker (that is, a speaker with an interactive and voice-activated artificial intelligence (AI) assistant function) is adopted as speaker 306. Without being limited as such, a general speaker that does not accept audio input may be adopted instead of the smart speaker.

TPD 302 accepts a touch input from a user or shows a map and other types of information. Speaker 306 accepts an audio input from a user or outputs sound (including voice). Operation button 305 also accepts an input from a user. Each of TPD 302, speaker 306, and operation button 305 functions as an input apparatus and outputs a signal corresponding to an input from the user to controller 301. Each of TPD 302 and speaker 306 functions as a notification apparatus and gives a notification to the user (for example, a driver and/or a passenger of EV 50).

GPS module 303 receives a signal (which is referred to as a "GPS signal" below) from a GPS satellite (not shown). Controller 301 identifies a position of EV 50 based on the GPS signal. By controlling TPD 302, controller 301 shows in real time a position of EV 50 on a map shown on TPD 302. Controller 301 searches for a path for finding an optimal route (for example, the shortest route) from the current position of EV 50 to a destination by executing a path search program, and shows the optimal route found by path search on the map shown on TPD 302. The user can set a destination in controller 301 through the input apparatus (that is, TPD 302, speaker 306, and operation button 305) described above. NAVI system 300 can detect a direction of travel of EV 50 with a not-shown yaw rate sensor (for example, a gyro sensor).

Input apparatus 310 is mounted on EV 50 separately from an input apparatus of NAVI system 300. Input apparatus 310 accepts an input from a user and outputs a signal corresponding to the input from the user to ECU 200. Communication between ECU 200 and input apparatus 310 may be wired or wireless. Examples of input apparatus 310 include various switches, various pointing devices, a keyboard, a smart speaker, and a touch panel.

Notification apparatus 320 is mounted on EV 50 separately from a notification apparatus of NAVI system 300. Notification apparatus 320 performs prescribed processing for giving a notification to a user (for example, a driver and/or a passenger of EV 50) when a request is given from ECU 200. Any of a display apparatus (for example, a touch panel display), a speaker (for example, a smart speaker), and a lamp (for example, a malfunction indicator lamp (MIL)) may be adopted as notification apparatus 320.

Figure 4:
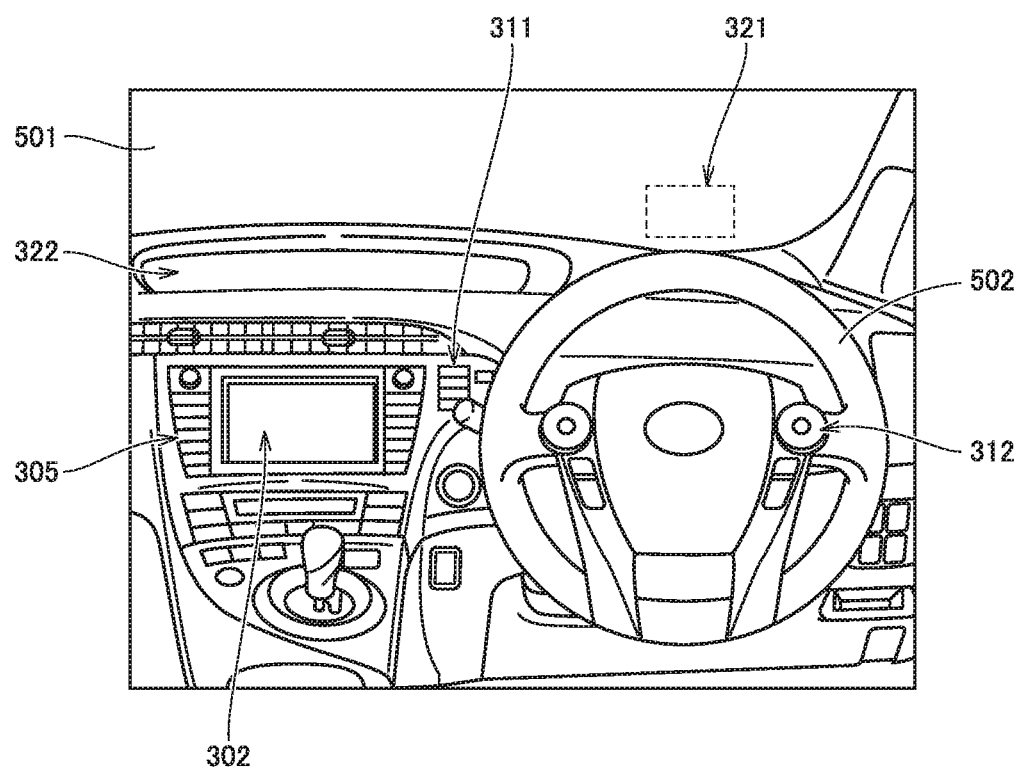
FIG. 4 is a diagram showing an input apparatus and a notification apparatus mounted in the vicinity of a driver's seat of an EV shown in FIG. 3.

FIG. 4 is a diagram showing the input apparatus and the notification apparatus mounted in the vicinity of a driver's seat of EV 50. Referring to FIG. 4, EV 50 includes operation buttons 311 and 312, a head-up display (which is referred to as a "HUD" below) 321, and a meter panel 322. Operation buttons 311 and 312 are included in input apparatus 310 (FIG. 3) described previously. Operation button 311 is provided in an instrumental panel of EV 50. Operation button 312 is provided in a steering wheel 502 of EV 50. Each of HUD 321 and meter panel 322 is included in notification apparatus 320 (FIG. 3) described previously. HUD 321 is a display provided in a windshield 501 of EV 50. Meter panel 322 is located in the vicinity of windshield 501 and shows information on EV 50 (for example, a remaining capacity of the battery (SOC), a traveling speed, a travel distance, average electric power consumption, and an outdoor temperature). Meter panel 322 shows also an indicator that gives a notification by a state of illumination thereof (for example, on/blink/off). Though not shown, a lamp that functions as such an indicator is provided in an instrument panel of EV 50. Furthermore, TPD 302 and operation button 305 of NAVI system 300 (FIG. 3) are provided in the instrument panel of EV 50. A main body of NAVI system 300 is arranged in the instrument panel.

Figure 5:
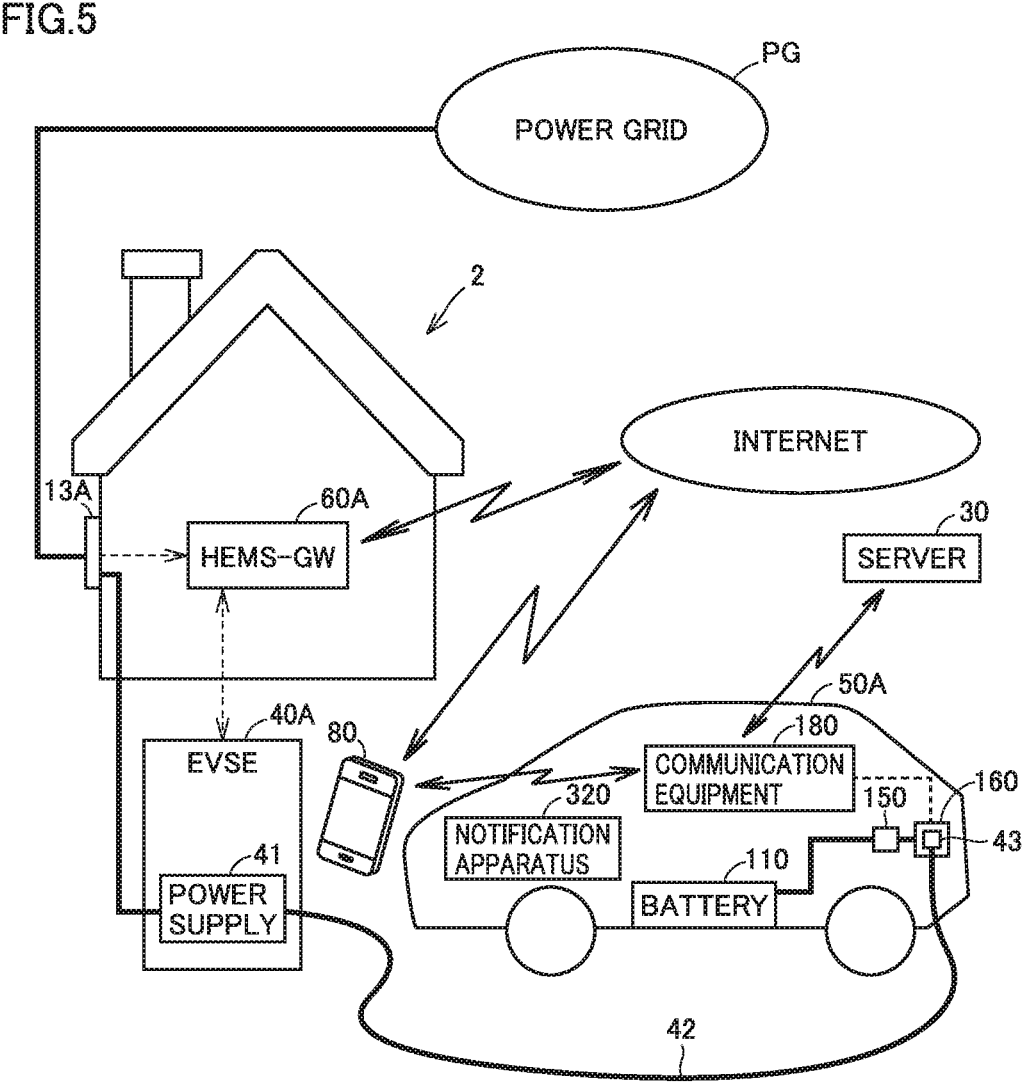
FIG. 5 is a diagram for illustrating the EV connected to EVSE in the VGI system shown in FIG. 1.

FIG. 5 is a diagram for illustrating EV 50A connected to EVSE 40A. Referring to FIG. 5, EV 50A is electrically connected to EVSE 40A through a charging cable 42 while it is parked in a parking space in a house 2 (for example, a user's own house) where EVSE 40A is installed. Charging cable 42 includes a connector 43 at its tip end. As connector 43 of charging cable 42 connected to EVSE 40A is connected to inlet 160 of EV 50A, communication between EV 50A and EVSE 40A can be established and electric power can be supplied from a power supply 41 (that is, a power supply provided outside EV 50A) included in EVSE 40A to EV 50A (and battery 110). Power supply 41 is connected to a power grid PG provided by electric power utility company E1 (FIG. 1) with smart meter 13A being interposed. Power supply 41 supplies electric power supplied from power grid PG to EV 50A through charging cable 42. An amount of power usage in EVSE 40A is measured by smart meter 13A.

HEMS-GW 60A receives an amount of power usage in EVSE 40A from smart meter 13A. Smart meter 13A and HEMS-GW 60A may communicate with each other in any type of communication, and the type of communication may be a 920-MHz-band low-power wireless communication or PLC. Portable terminal 80 wirelessly communicates with HEMS-GW 60A through the Internet. Communication equipment 180 mounted on EV 50A communicates with EVSE 40A through charging cable 42. Communication equipment 180 wirelessly communicates with server 30, for example, through a mobile communication network. In this embodiment, communication equipment 180 and portable terminal 80 wirelessly communicate with each other. Communication equipment 180 and portable terminal 80 may communicate with each other through short-range communication (for example, direct communication in a vehicle or within an area around the vehicle). Though server 30 and EVSE 40A do not communicate with each other in this embodiment, server 30 and EVSE 40A may be able to communicate with each other. At least one of communication equipment 180 and portable terminal 80 receives an amount of power usage in EVSE 40A from smart meter 13A. At least one of notification apparatus 320 and portable terminal 80 may show at least one of a value measured by smart meter 13A, a DR amount allocated to EV 50A, and a rate of achievement of the DR amount during charging or discharging of battery 110.

A configuration around EVSE 40B is substantially the same as the configuration (see FIG. 5) around EVSE 40A except for change of HEMS-GW 60A to BEMS-GW 60B and change of smart meter 13A to smart meter 13B.

ECU 200 according to this embodiment can appropriately give a notification to invite a driver of EV 50 to participate in DR with a configuration described below. ECU 200 can improve convenience of a user by appropriately giving a notification to invite participation in DR.

Figure 6:
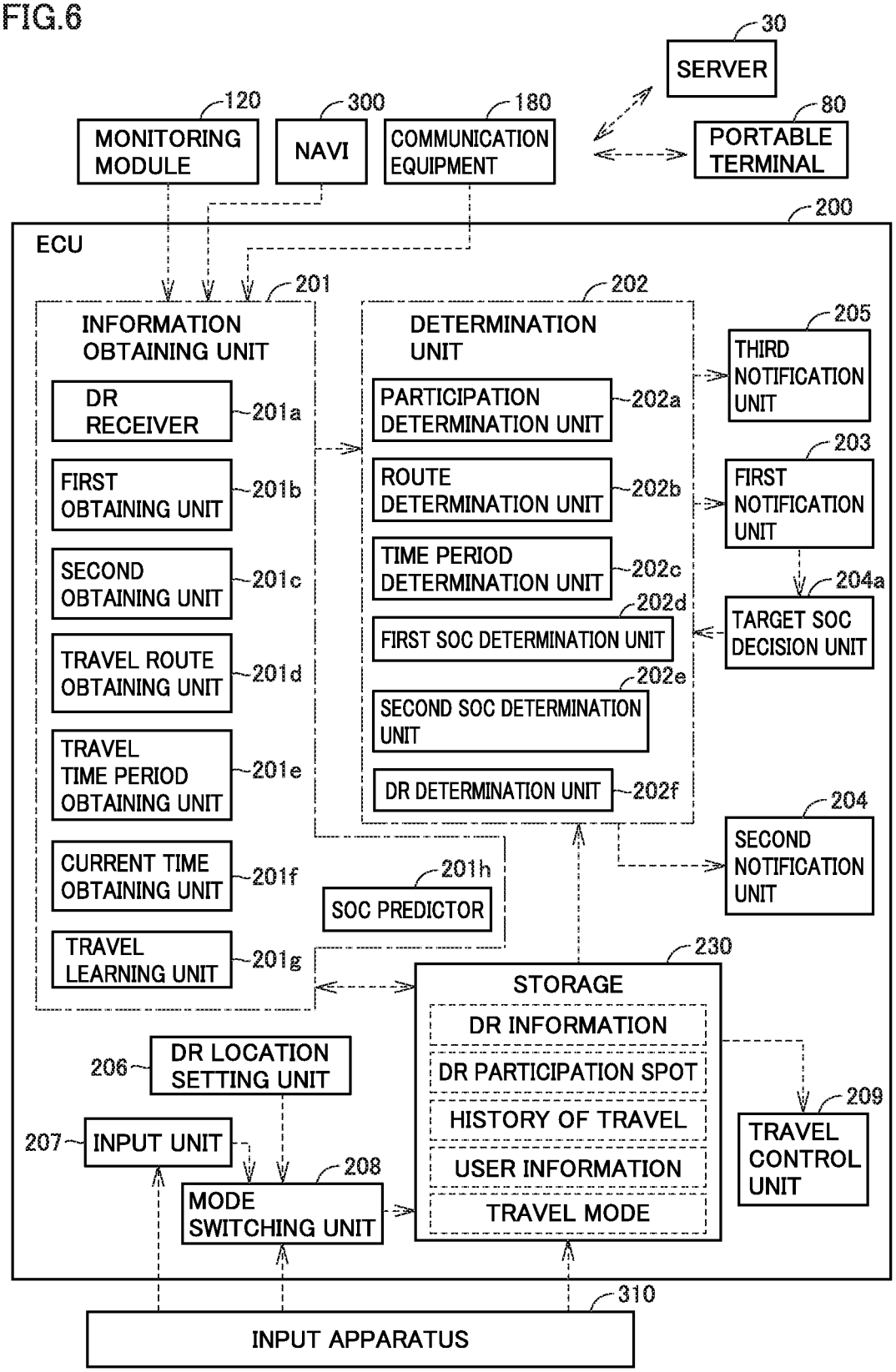
FIG. 6 is a diagram showing for each function, a component of a controller of a vehicle according to the first embodiment of the present disclosure.

FIG. 6 is a diagram showing a component of ECU 200 for each function. Referring to FIG. 6 together with FIG. 3, ECU 200 includes an information obtaining unit 201, a determination unit 202, a first notification unit 203, a second notification unit 204, a target SOC decision unit 204a, a third notification unit 205, a DR location setting unit 206, an input unit 207, a mode switching unit 208, and a travel control unit 209 which will be described below. In ECU 200 according to this embodiment, each component above is implemented by processor 210 and a program executed by processor 210. Without being limited as such, each component may be implemented by dedicated hardware (electronic circuitry).

Information obtaining unit 201 includes a DR receiver 201a, a first obtaining unit 201b, a second obtaining unit 201c, a travel route obtaining unit 201d, a travel time period obtaining unit 201e, a current time obtaining unit 201f, a travel learning unit 201g, and an SOC predictor 201h.

DR receiver 201a receives from server 30 through communication equipment 180, a demand response (DR) signal that represents a content (for example, a type of DR, a DR amount for EV 50, and a DR period) of DR that requests power leveling. When DR receiver 201a receives a DR signal, it has storage 230 store information on DR (DR information) represented by the DR signal. DR receiver 201a according to this embodiment corresponds to an exemplary "receiver" according to the present disclosure.

When a DR participation request that requests participation in DR is given from server 10 to each server 20 in VGI system 1 shown in FIG. 1, each server 20 transmits an adjustable DR amount to server 10. Server 10 that has received the adjustable DR amount determines a parent AG that will participate in DR and transmits a first DR execution instruction to server 20 of each parent AG that will participate in DR. Each server 20 that has received the first DR execution instruction determines a child AG that will participate in DR and transmits a second DR execution instruction to server 30 of each child AG that will participate in DR. Each server 30 that has received the second DR execution instruction determines EV 50 that will participate in DR and transmits a DR signal to each EV 50 that will participate in DR. DR receiver 201a receives this DR signal. DR may immediately be started when DR receiver 201a receives the DR signal or may be started at timing after reception of the DR signal by DR receiver 201a. DR start timing is indicated by a DR period included in the DR signal.

First obtaining unit 201b obtains a position of EV 50. In this embodiment, first obtaining unit 201b obtains a GPS signal (that is, a signal indicating a position of EV 50) from GPS module 303 of NAVI system 300.

Second obtaining unit 201c obtains a remaining amount of power stored in battery 110. In this embodiment, second obtaining unit 201c obtains a remaining amount of power stored in battery 110 (for example, an SOC of battery 110) based on an output from monitoring module 120.

Travel route obtaining unit 201d obtains a travel route from the position of EV 50 obtained by first obtaining unit 201b to a DR participation spot in storage 230. In this embodiment, a DR participation spot is set in ECU 200 by DR location setting unit 206 or input unit 207 which will be described later. The DR participation spot set in ECU 200 is stored in storage 230. Travel route obtaining unit 201d can obtain the travel route from NAVI system 300 by transmitting the position of EV 50 and the DR participation spot to NAVI system 300 and instructing the NAVI system to search for a path.

Travel time period obtaining unit 201e obtains a travel time period required for reaching the DR participation spot in storage 230 from the position of EV 50 obtained by first obtaining unit 201b. In this embodiment, travel time period obtaining unit 201e calculates a distance of travel over the travel route obtained by travel route obtaining unit 201d, obtains from travel learning unit 201g which will be described later, an average traveling speed until reaching the DR participation spot from the position of EV 50, and calculates the travel time period based on the obtained distance of travel and average traveling speed. In this embodiment, travel time period obtaining unit 201e, in coordination with travel learning unit 201g, calculates the travel time period based on the history of travel of EV 50. Travel time period obtaining unit 201e may estimate the average traveling speed based on at least one of a statutory highest speed over the travel route and a degree of congestion of the travel route. Travel time period obtaining unit 201e may obtain the travel route from travel learning unit 201g which will be described later.

Current time obtaining unit 201f obtains current time. Current time obtaining unit 201f may obtain current time by using a real time clock (RTC) circuit (not shown) contained in ECU 200 or from the outside of EV 50 through communication equipment 180.

Travel learning unit 201g sequentially obtains a state of EV 50 (for example, a position of the vehicle, a remaining capacity in the battery, and a condition for travel) and has storage 230 record the state. The condition for travel recorded in storage 230 includes a traveling speed, discharging power of battery 110 during traveling, and a travel mode. As such data is accumulated in storage 230, the history of travel (that is, data representing a state of EV 50 in past travel) of EV 50 is stored in storage 230. Travel learning unit 201g estimates an average traveling speed of EV 50 over a prescribed travel route by learning of the history of travel of EV 50 accumulated in storage 230. Travel learning unit 201g may estimate the travel route by learning.

SOC predictor 201h predicts an arrival-timing SOC (that is, a remaining amount of power stored in battery 110 at the time point of arrival of EV 50 at the DR participation spot in storage 230). SOC predictor 201h can predict the arrival-timing SOC based, for example, on a current remaining amount of power stored in battery 110 and the travel route. SOC predictor 201h can obtain the travel route from travel route obtaining unit 201d or travel learning unit 201g. In prediction of the arrival-timing SOC, SOC predictor 201h may take into account, at least one of tendency of driving by a user estimated from the history of travel of EV 50 and a degree of congestion over the travel route. SOC predictor 201h according to this embodiment corresponds to an exemplary "predictor" according to the present disclosure.

Determination unit 202 includes a participation determination unit 202a, a route determination unit 202b, a time period determination unit 202c, a first SOC determination unit 202d, a second SOC determination unit 202e, and a DR determination unit 202f. Participation determination unit 202a, route determination unit 202b, time period determination unit 202c, first SOC determination unit 202d, and second SOC determination unit 202e according to this embodiment correspond to an exemplary "first determination unit," an exemplary "second determination unit," an exemplary "third determination unit," an exemplary "fifth determination unit," and an exemplary "sixth determination unit" according to the present disclosure, respectively.

When DR receiver 201a receives a prescribed target DR signal, participation determination unit 202a, in coordination with route determination unit 202b, time period determination unit 202c, and first SOC determination unit 202d, determines whether or not EV 50 can participate in DR at a prescribed DR participation spot (that is, the DR participation spot stored in storage 230) based on the timing of start of DR indicated by the DR signal, a position of EV 50 obtained by first obtaining unit 201b, and a remaining amount of power stored in battery 110 obtained by second obtaining unit 201c.

When DR receiver 201a receives the DR signal, DR determination unit 202f determines whether or not the DR signal is the target DR signal. In this embodiment, a DR signal in response to which demand response (DR) is started before prescribed timing is defined as a target DR signal. When the DR start timing indicated by the DR signal comes later than the prescribed timing, DR determination unit 202f determines that the DR signal is not the target DR signal. In this embodiment, timing after lapse of five hours since the current time is defined as the prescribed timing. Without being limited as such, any prescribed timing (and target DR signal) can be set. For example, a DR signal in response to which DR is started within this day (that is, by the time of end of the day of reception of the DR signal) may be determined as the target DR signal, and a DR signal in response to which DR is started on the next day or later may be determined as not the target DR signal. The target DR signal may be limited to a DR signal of a specific type of DR (for example, DR suppression or DR increase).

Route determination unit 202b determines whether or not EV 50 can reach the DR participation spot by traveling in accordance with the travel route without increasing the remaining amount of power stored in battery 110 by external charging, based on the travel route obtained by travel route obtaining unit 201d and the remaining amount of power stored in battery 110 obtained by second obtaining unit 201c. When EV 50 runs out of power before reaching the DR participation spot, route determination unit 202b makes determination as NO (the EV cannot arrive). When the remaining amount of power stored in battery 110 is equal to or larger than a prescribed SOC value (which is referred to as a "threshold value X" below), route determination unit 202b makes determination as YES (the EV can arrive). Threshold value X is variable and route determination unit 202b sets threshold value X based, for example, on the travel route.

Time period determination unit 202c determines whether or not EV 50 can reach the DR participation spot before start of DR, based on the DR start timing and the travel time period obtained by travel time period obtaining unit 201e. When EV 50 cannot reach the DR participation spot in time for the DR start timing, time period determination unit 202c makes determination as NO (the EV cannot arrive). When the time of arrival of EV 50 at the DR participation spot is before the DR start timing, time period determination unit 202c makes determination as YES (the EV can arrive).

First SOC determination unit 202d determines whether or not the arrival-timing SOC predicted by SOC predictor 201h is within a prescribed allowable range. When the arrival-timing SOC is within the allowable range, first SOC determination unit 202d makes determination as YES, and when the arrival-timing SOC is out of the allowable range, first SOC determination unit 202d makes determination as NO. Any allowable range can be set. The allowable range may be variable in accordance with a type of DR (for example, DR suppression/DR increase). First SOC determination unit 202d may set, for example, the allowable range of DR increase on a lower SOC side than the allowable range of DR suppression. The allowable range may be set to an SOC range within which a minimum incentive (for example, at least 10% of a prescribed target incentive) can be gained by participation in DR. The allowable range according to this embodiment corresponds to an exemplary "first range" according to the present disclosure.

In this embodiment, when DR receiver 201a receives the target DR signal, participation determination unit 202a obtains a result of determination from each of route determination unit 202b, time period determination unit 202c, and first SOC determination unit 202d. When at least one of the results of determination by these units is "NO", the participation determination unit determines that the EV cannot participate, and when the results of determination by all the units are "YES", the participation determination unit determines that the EV can participate.

When participation determination unit 202a determines that the EV can participate, first notification unit 203 causes a prescribed notification apparatus (in this embodiment, TPD 302 of NAVI system 300) to perform first notification processing for inviting EV 50 to go to the DR participation spot. First notification unit 203 may cause notification apparatus 320 or portable terminal 80 instead of NAVI system 300 to perform first notification processing.

Target SOC decision unit 204a determines a target range of the arrival-timing SOC based on a content of demand response (DR) represented by the target DR signal received by DR receiver 201a. Target SOC decision unit 204a determines an SOC range suitable for DR (more specifically, a range narrower than the allowable range described previously) and sets that SOC range as the target range based on the content of DR (for example, a type of DR and a DR amount). The target range may be an SOC range within which a prescribed target incentive can be gained by participation in DR. Target SOC decision unit 204a and the target range according to this embodiment correspond to an exemplary "decision unit" and an exemplary "second range" according to the present disclosure, respectively.

When participation determination unit 202a determines that the EV can participate, second SOC determination unit 202e determines whether or not the arrival-timing SOC predicted by SOC predictor 201h is within the target range determined by target SOC decision unit 204a. When the arrival-timing SOC is within the target range, second SOC determination unit 202e makes determination as YES, and when the arrival-timing SOC is out of the target range, second SOC determination unit 202e makes determination as NO.

When second SOC determination unit 202e makes determination as NO (that is, the arrival-timing SOC is out of the target range), second notification unit 204 causes a prescribed notification apparatus (in this embodiment, TPD 302 of NAVI system 300) to perform second notification processing for inviting the EV to modify the condition for travel of EV 50 (for example, at least one of the travel route and the travel mode) such that the arrival-timing SOC is closer to the target range. Second notification unit 204 may cause notification apparatus 320 or portable terminal 80 instead of NAVI system 300 to perform second notification processing.

When participation determination unit 202a determines that the EV cannot participate, third notification unit 205 causes a prescribed notification apparatus (in this embodiment, TPD 302 of NAVI system 300) to perform third notification processing for notifying a driver of EV 50 that the EV cannot participate in DR. Third notification unit 205 may cause notification apparatus 320 or portable terminal 80 instead of NAVI system 300 to perform third notification processing.

In this embodiment, the DR participation spot is set in ECU 200 in a plurality of types of setting modes. In this embodiment, update of the DR participation spot stored in storage 230 corresponds to processing for setting the DR participation spot in ECU 200. The mode of setting the DR participation spot includes an automatic setting mode and a user input mode. Mode switching unit 208 switches between the setting modes based on an input from a user. When the user instructs mode switching unit 208 to switch between the notification modes through input apparatus 310, mode switching unit 208 switches between the setting modes in accordance with an instruction from the user. The user can select a desired setting mode (in this embodiment, the automatic setting mode or the user input mode) through input apparatus 310 and mode switching unit 208. When the user selects the automatic setting mode, DR location setting unit 206 sets the DR participation spot in ECU 200. When the user selects the user input mode, input unit 207 sets the DR participation spot in ECU 200. The user may instruct mode switching unit 208 to switch between the setting modes through NAVI system 300 or portable terminal 80 instead of input apparatus 310.

Input unit 207 accepts input of the DR participation spot by a user. Input unit 207 is in an on state in the user input mode and in an off state in the automatic setting mode. When the user inputs the DR participation spot into input unit 207 through input apparatus 310 in the user input mode, input unit 207 updates the DR participation spot in storage 230 to the DR participation spot input by the user. The user may input the DR participation spot into input unit 207 through NAVI system 300 or portable terminal 80 instead of input apparatus 310.

When DR receiver 201a receives the target DR signal, for example, input unit 207 may have TPD 302 (FIG. 4) of NAVI system 300 show an input screen which will be described below.

Figure 7:
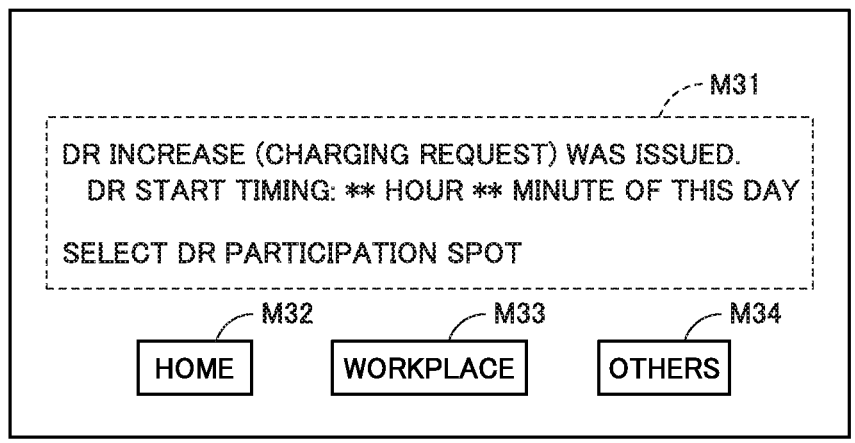
FIG. 7 is a diagram for illustrating a modification of a user input mode.

FIG. 7 is a diagram for illustrating a modification of the user input mode. Referring to FIG. 7, this screen includes a display section M31, a "home" button M32, a "workplace" button M33, and an "others" button M34. Display section M31 shows a content of DR (for example, a type of DR and DR start timing) and shows explanation about each button. When the user presses "home" button M32, input unit 207 updates the DR participation spot in storage 230 to the user's home. When the user presses "workplace" button M33, input unit 207 updates the DR participation spot in storage 230 to the user's workplace. Position information on each of the user's home and workplace is included in user information (FIG. 6) stored in advance in storage 230. When the user presses "others" button M34, the user can input a location that is neither the home nor the workplace. Input unit 207 updates the DR participation spot in storage 230 to the location input by the user.

DR location setting unit 206 is in an on state in the automatic setting mode and in an off state in the user input mode. DR location setting unit 206 selects one of a plurality of predetermined locations (in this embodiment, the user's home and workplace) and sets the selected location as the DR participation spot in ECU 200. DR location setting unit 206 sets the DR participation spot in ECU 200 by updating the DR participation spot in storage 230. In this embodiment, DR location setting unit 206 determines whether EV 50 is traveling for going to work, traveling for going home, or in another state based on the position of EV 50, a direction of travel of EV 50, the travel route of EV 50, and current time. When EV 50 is determined as traveling for going to work, the DR location setting unit selects the workplace, when EV 50 is determined as traveling for going home, the DR location setting unit selects home, and when EV 50 is determined as being in a state other than those, the DR location setting unit selects a prescribed location. DR location setting unit 206 according to this embodiment corresponds to an exemplary "setting unit" according to the present disclosure.

Figure 8:
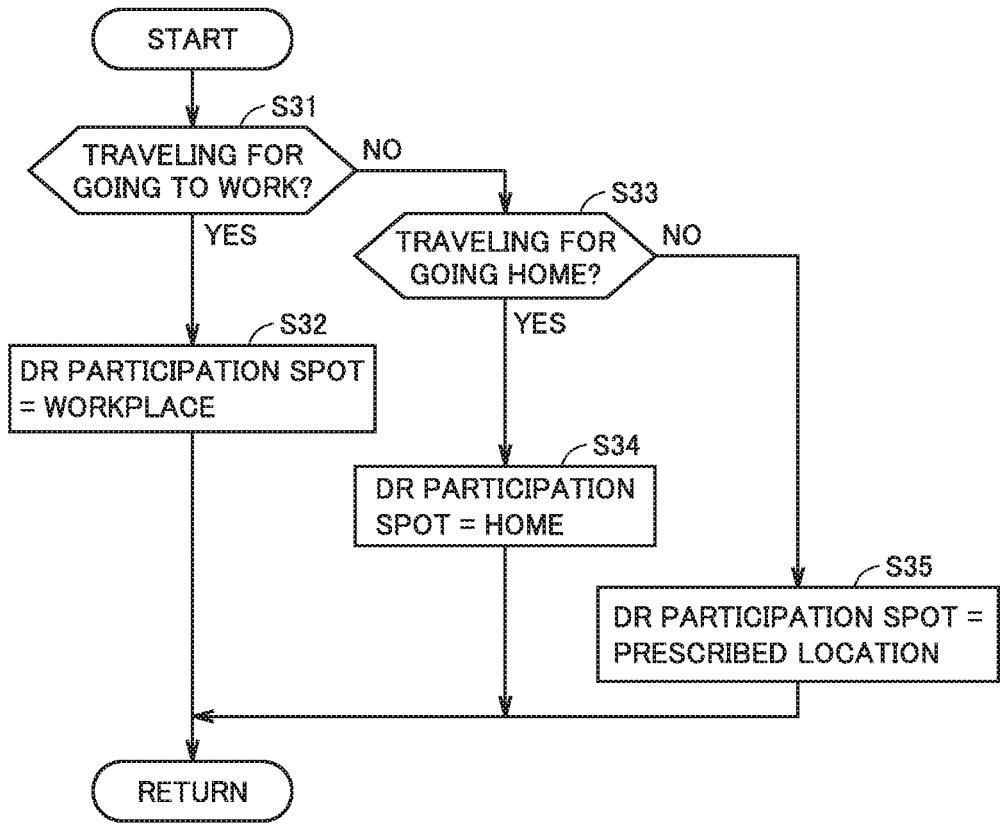
FIG. 8 is a flowchart showing processing performed by a controller of the vehicle in an automatic setting mode according to the first embodiment of the present disclosure.

FIG. 8 is a flowchart showing processing performed by ECU 200 in the automatic setting mode. Processing shown in this flowchart is repeatedly performed when the mode of setting the DR participation spot is set to the automatic setting mode.

Referring to FIG. 8, in step (which is also simply denoted as "S" below) 31, DR location setting unit 206 determines whether or not EV 50 is traveling for going to work. When it is determined that EV 50 is traveling for going to work (YES in S31), in S32, DR location setting unit 206 updates the DR participation spot in storage 230 to the user's workplace. When it is determined that EV 50 is not traveling for going to work (NO in S31), in S33, DR location setting unit 206 determines whether or not EV 50 is traveling for going home. When it is determined that EV 50 is traveling for going home (YES in S33), in S34, DR location setting unit 206 updates the DR participation spot in storage 230 to the user's home. When it is determined that EV 50 is not traveling for going home (NO in S33), in S35, DR location setting unit 206 updates the DR participation spot in storage 230 to a prescribed location. Any prescribed location can be set, and for example, the user's home may be set.

DR location setting unit 206 makes determination in each of S31 and S33 based on the position of EV 50, the direction of travel of EV 50, the travel route of EV 50, and the current time. For example, when the current time is within commuting hours, EV 50 is highly likely to travel for going to work. When EV 50 travels as approaching the workplace as well, EV 50 is highly likely to travel for going to work.

DR location setting unit 206 may switch the DR participation spot based only on the direction of travel of EV 50. FIG. 9 is a diagram for illustrating a first modification of the automatic setting mode. Referring to FIG. 9, when EV 50 travels toward a first location (for example, the workplace), DR location setting unit 206 may set the first location as the DR participation spot in ECU 200, and when EV 50 travels toward a second location (for example, home), the DR location setting unit may set the second location as the DR participation spot in ECU 200.

DR location setting unit 206 may switch the DR participation spot based only on the current time. FIG. 10 is a diagram for illustrating a second modification of the automatic setting mode. Referring to FIG. 10, when the current time is within a first time period (for example, in the morning of a working day), it may set the first location (for example, the workplace) as the DR participation spot in ECU 200, and when the current time is within any of a second time period (for example, in the afternoon of a working day) and a third time period (for example, a day off), the DR location setting unit may set a second location (for example, home) as the DR participation spot in ECU 200.

Referring again to FIG. 6, travel control unit 209 controls travel of EV 50 in a plurality of types of travel modes. In this embodiment, the travel mode of EV 50 includes a standard mode and a power saving mode. The standard mode refers to a travel mode in which travel is controlled such that power for traveling and electric power consumption are balanced. The power saving mode refers to a travel mode in which travel is controlled with electric power consumption being more prioritized than in the standard mode. The travel mode of EV 50 is stored in storage 230 and the user can switch between the travel modes of EV 50 through input apparatus 310. Travel control unit 209 carries out travel control in accordance with the travel mode in storage 230.

FIG. 11 is a flowchart showing processing involved with first notification control performed by ECU 200. Processing shown in this flowchart is repeatedly performed in prescribed cycles. The DR participation spot used in the processing in FIG. 11 is a DR participation spot set in ECU 200 (that is, a DR participation spot in storage 230).

Referring to FIG. 11 together with FIG. 6, in S11, DR receiver 201a determines whether or not it has received a DR signal from server 30. While it is determined that the signal has not been received (NO in S11), processing in S11 is repeatedly performed. When it is determined that the signal has been received (YES in S11), the process proceeds to S12.

In S12, first obtaining unit 201b obtains the current position of EV 50 and current time obtaining unit 201f obtains the current time. In succession, in S13, DR determination unit 202f obtains from storage 230, DR start timing (which is also referred to as "$T_{DR}$" below) indicated by the DR signal received by DR receiver 201a. DR determination unit 202f further determines in S14 whether or not $T_{DR}$ obtained in S13 comes before prescribed timing. When it is determined that $T_{DR}$ does not come before prescribed timing (NO in S14), the process returns to S11. $T_{DR}$ not coming before prescribed timing means that the DR signal received by DR receiver 201a is not the target DR signal. When it is determined that $T_{DR}$ comes before prescribed timing (YES in S14), the process proceeds to S15. $T_{DR}$ coming before prescribed timing means that the DR signal received by DR receiver 201a is the target DR signal.

In S15, second obtaining unit 201c obtains a current remaining amount of power stored in battery 110 (for example, SOC of battery 110). In S16, travel route obtaining unit 201d obtains the travel route from the current position of EV 50 to the DR participation spot. In S17, travel time period obtaining unit 201e, in coordination with travel learning unit 201g, obtains a travel time period required to reach the DR participation spot from the current position of EV 50.

When the automatic setting mode is set as the mode of setting the DR participation spot, the processing in FIG. 8 described previously is performed in parallel to the processing in FIG. 11. When the user input mode is set as the mode of setting the DR participation spot, in the processing in FIG. 11, between S14 and S16, the input screen shown in FIG. 7 may be shown on TPD 302 (FIG. 4) of NAVI system 300 and input of the DR participation spot from the user may be accepted.

In S18 in FIG. 11, participation determination unit 202a, in coordination with route determination unit 202b, time period determination unit 202c and first SOC determination unit 202d, determines whether or not EV 50 can participate in DR at the DR participation spot. FIG. 12 is a flowchart showing details of determination as to participation in DR made in S18 in FIG. 11.

Referring to FIG. 12 together with FIGS. 6 and 11, in S21, route determination unit 202b determines whether or not EV 50 can reach the DR participation spot by traveling over the travel route without increasing the remaining amount of power stored in battery 110 by external charging, based on the remaining amount of power stored in battery 110 (S15 in FIG. 11) and the travel route (S16 in FIG. 11).

In S22, time period determination unit 202c determines whether or not EV 50 can reach the DR participation spot before start of DR, based on the DR start timing (S13 in FIG. 11) and the travel time period (S17 in FIG. 11).

In S23, SOC predictor 201h predicts an arrival-timing SOC based on the remaining amount of power stored in battery 110 (S15 in FIG. 11) and the travel route (S16 in FIG. 11). In S24, first SOC determination unit 202d determines whether or not the arrival-timing SOC is within the allowable range.

When determination as YES is made in all of S21, S22, and S24, participation determination unit 202a determines that the EV can participate (S25). When determination as NO is made in any of S21, S22, and S24, participation determination unit 202a determines that the EV cannot participate (S26).

Referring again to FIG. 11 together with FIG. 6, determination in S25 in FIG. 12 by participation determination unit 202a that the EV can participate means that determination as YES is made in S18. When determination as YES is made in S18, first notification unit 203 causes TPD 302 (FIG. 4) of NAVI system 300 to perform the previously-described first notification processing in S191.

Figure 13:
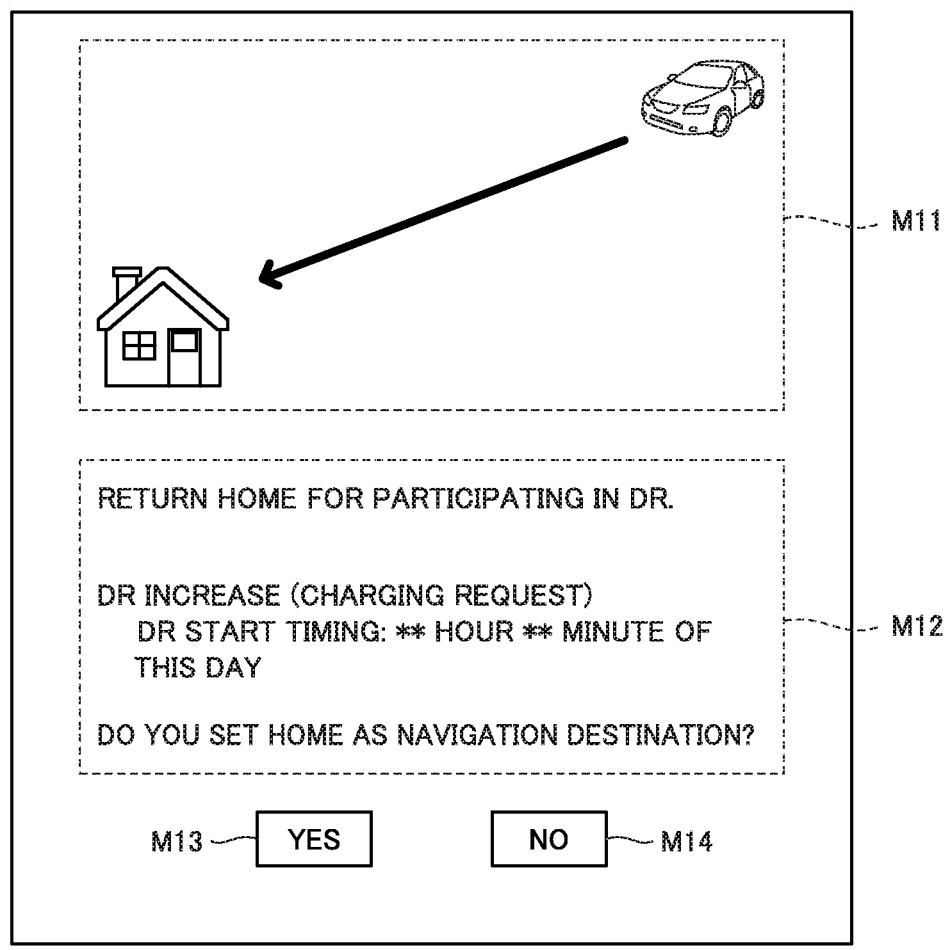
FIG. 13 is a diagram showing a first exemplary screen shown in first notification processing.

FIG. 13 is a diagram showing a first exemplary screen shown on TPD 302 in S191 in FIG. 11. The screen in FIG. 13 is shown when the user's home is set as the DR participation spot.

Referring to FIG. 13, this screen includes display sections M11 and M12, a "YES" button M13, and a "NO" button M14. Display section M11 shows an image that invites EV 50 to go to the DR participation spot (that is, the user's home). Display section M12 shows a message that invites EV 50 to go to the DR participation spot (that is, the user's home). Display section M12 also shows a content of DR (for example, a type of DR and DR start timing). Display section M12 further shows explanation about "YES" button M13 and "NO" button M14. When the user presses "YES" button M13, the user's home is set as a destination in NAVI system 300, NAVI system 300 searches for a path, and TPD 302 (FIG. 4) shows the optimal route from the current position of EV 50 to the user's home. When the user presses "NO" button M14, the screen shown on TPD 302 is switched to a prescribed screen without change in destination.

Figure 14:
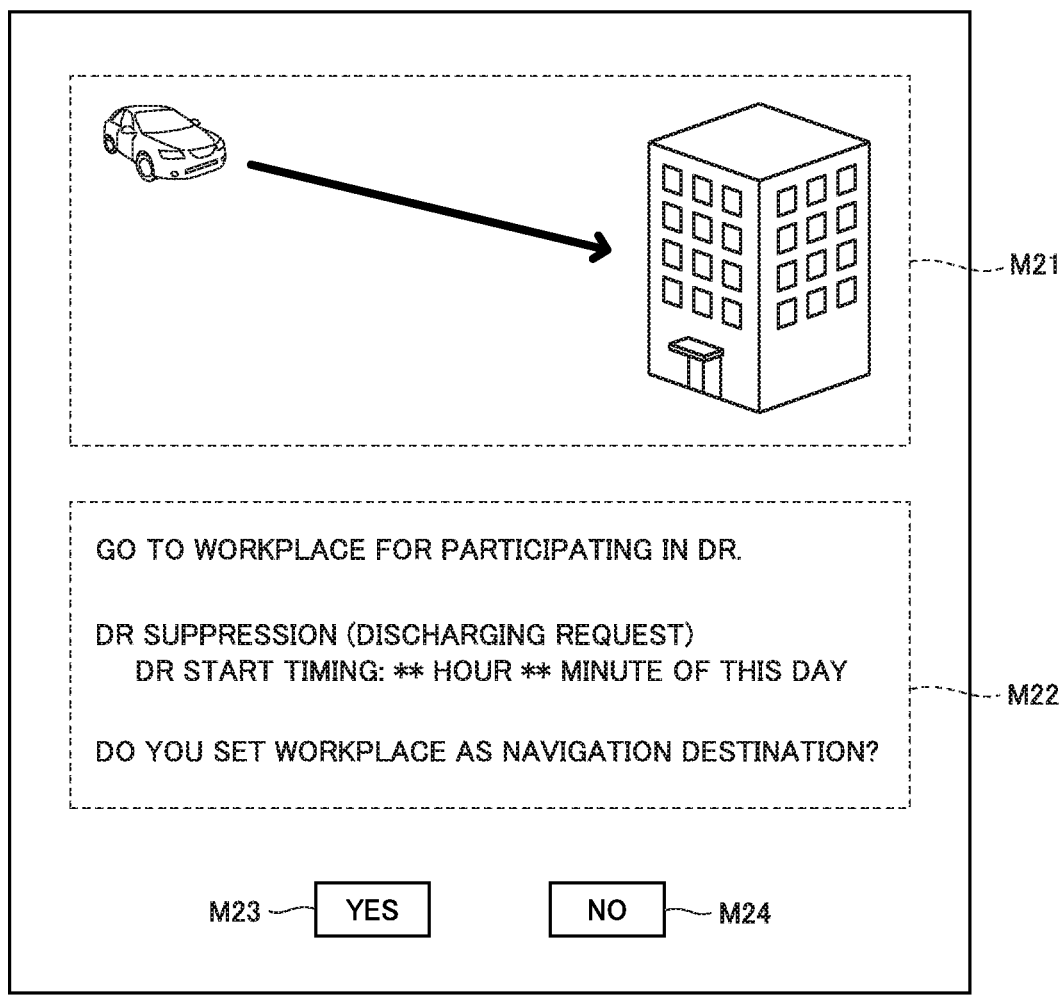
FIG. 14 is a diagram showing a second exemplary screen shown in the first notification processing.

FIG. 14 is a diagram showing a second exemplary screen shown on TPD 302 in S191 in FIG. 11. The screen in FIG. 14 is shown when the user's workplace is set as the DR participation spot.

Referring to FIG. 14, this screen includes display sections M21 and M22, a "YES" button M23, and a "NO" button M24. Display section M21 shows an image that invites EV 50 to go to the DR participation spot (that is, the user's workplace). Display section M22 shows a message that invites EV 50 to go to the DR participation spot (that is, the user's workplace). Display section M22 also shows a content of DR (for example, a type of DR and DR start timing). Display section M22 further shows explanation about "YES" button M23 and "NO" button M24. When the user presses "YES" button M23, the user's workplace is set as a destination in NAVI system 300, NAVI system 300 searches for a path, and TPD 302 (FIG. 4) shows the optimal route from the current position of EV 50 to the user's workplace. When the user presses "NO" button M24, the screen shown on TPD 302 is switched to a prescribed screen without change in destination.

Figure 15:
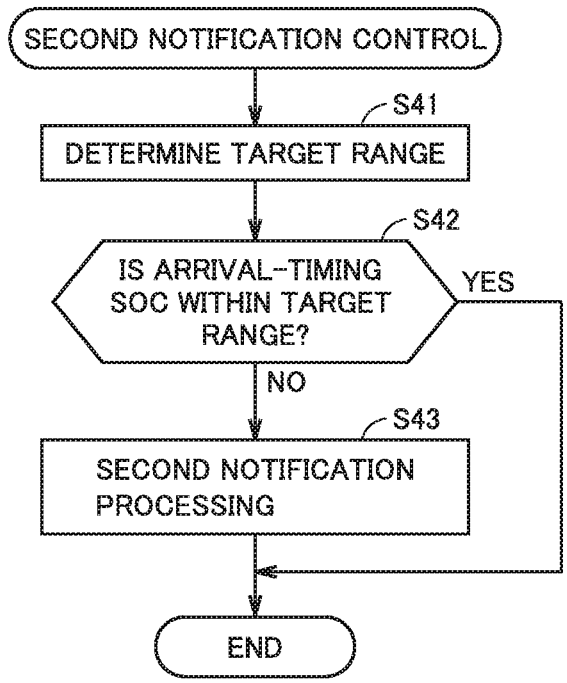
FIG. 15 is a flowchart showing processing involved with second notification control performed by the controller of the vehicle according to the first embodiment of the present disclosure.

In this embodiment, after the processing in S191 in FIG. 11, processing in FIG. 15 which will be described below is performed. FIG. 15 is a flowchart showing processing involved with second notification control performed by ECU 200.

Referring to FIG. 15 together with FIG. 6, in S41, target SOC decision unit 204a obtains DR information from storage 230 and determines a target range of the arrival-timing SOC based on DR information (for example, a type of DR and a DR amount). The target range of the arrival-timing SOC is narrower than the allowable range of the arrival-timing SOC (S24 in FIG. 12). In S42, second SOC determination unit 202e determines whether or not the arrival-timing SOC is within the target range. When it is determined that the arrival-timing SOC is within the target range (YES in S42), a series of processing in FIG. 15 (and a series of processing in FIG. 11) ends.

When it is determined that the arrival-timing SOC is out of the target range (NO in S42), second notification unit 204 causes TPD 302 (FIG. 4) of NAVI system 300 to perform the previously-described second notification processing in S43.

Figure 16:
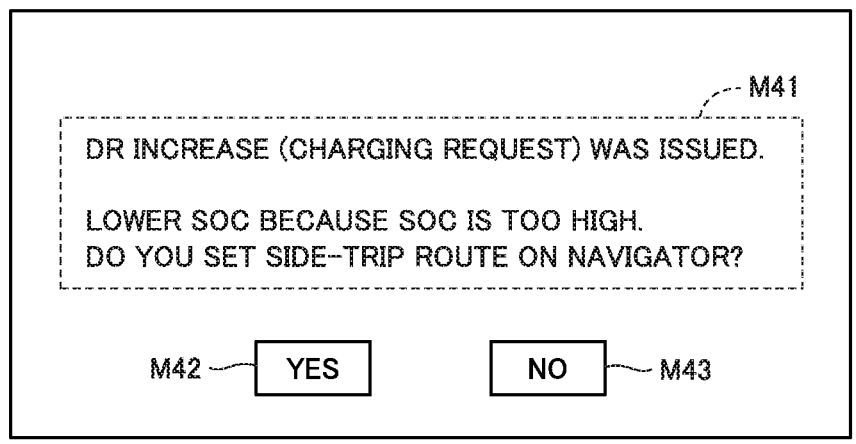
FIG. 16 is a diagram showing a first exemplary screen shown in second notification processing.

FIG. 16 is a diagram showing a first exemplary screen shown on TPD 302 in S43 in FIG. 15. A screen in FIG. 16 is shown when the type of DR indicated by the target DR signal received by DR receiver 201a is DR increase and it is determined in S42 in FIG. 15 that the arrival-timing SOC is higher than the target range.

Referring to FIG. 16, this screen includes a display section M41, a "YES" button M42, and a "NO" button M43. Display section M41 shows a content of DR (for example, a type of DR) and shows a message that invites a user to modify a condition for travel of EV 50 such that the arrival-timing SOC is closer to the target range. Display section M41 invites the user to change the travel route. More specifically, display section M41 invites the user to change the travel route to a side-trip route (that is, a travel route longer in travel distance than the current travel route). Display section M41 shows explanation about "YES" button M42 and "NO" button M43. When the user presses "YES" button M42, the travel route is changed to the side-trip route and the side-trip route is shown on TPD 302 (FIG. 4). When the user presses "NO" button M43, the screen shown on TPD 302 is switched to a prescribed screen without change in travel route.

Figure 17:
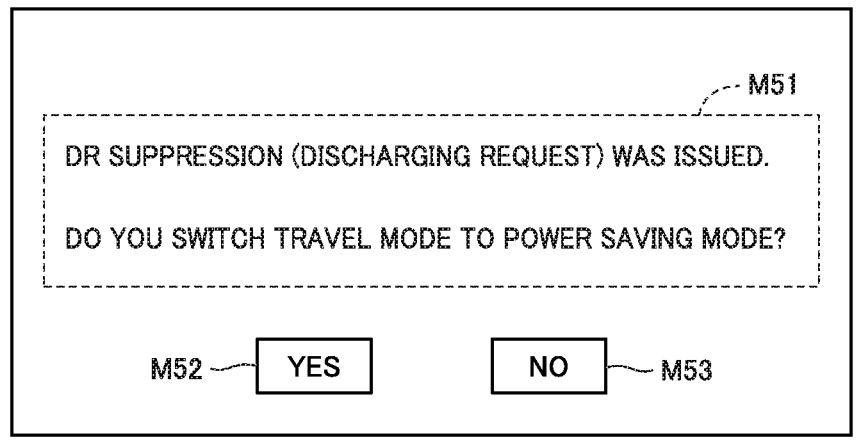
FIG. 17 is a diagram showing a second exemplary screen shown in the second notification processing.

FIG. 17 is a diagram showing a second exemplary screen shown on TPD 302 in S43 in FIG. 15. The screen in FIG. 17 is shown when a type of DR indicated by the target DR signal received by DR receiver 201a is DR suppression, the standard mode is set as the travel mode of EV 50, and it is determined in S42 in FIG. 15 that the arrival-timing SOC is lower than the target range.

Referring to FIG. 17, this screen includes a display section M51, a "YES" button M52, and a "NO" button M53. Display section M51 shows a content of DR (for example, a type of DR) and shows a message that invites the user to modify the condition for travel of EV 50 such that the arrival-timing SOC is closer to the target range. Display section M51 invites the user to change the travel mode. More specifically, display section M51 invites the user to switch the travel mode from the standard mode to the power saving mode (a power consumption suppression mode). Display section M51 shows explanation about "YES" button M52 and "NO" button M53. When the user presses "YES" button M52, the travel mode in storage 230 is changed from the standard mode to the power saving mode. Travel control unit 209 (FIG. 6) thus carries out travel control in the power saving mode. When the user presses "NO" button M53, the screen shown on TPD 302 is switched to a prescribed screen without change in travel mode.

The second notification processing is not limited to the above. For example, when the type of DR is DR increase, the user may be invited to change the travel mode (for example, change from the power saving mode to the standard mode) in the second notification processing. In a PHV vehicle, the user may be invited to switch between a charge depleting (CD) mode and a charge sustaining (CS) mode in the second notification processing. It is not essential that ECU 200 carries out second notification control. ECU 200 may be configured not to perform processing in FIG. 15 (and second notification processing) after processing in S191 in FIG. 11.

Determination in S26 in FIG. 12 by participation determination unit 202a that the EV cannot participate means that determination as NO is made in S18 in FIG. 11. When determination as NO is made in S18 in FIG. 11, third notification unit 205 causes TPD 302 (FIG. 4) of NAVI system 300 to perform the previously-described third notification processing in S192.

Figure 18:
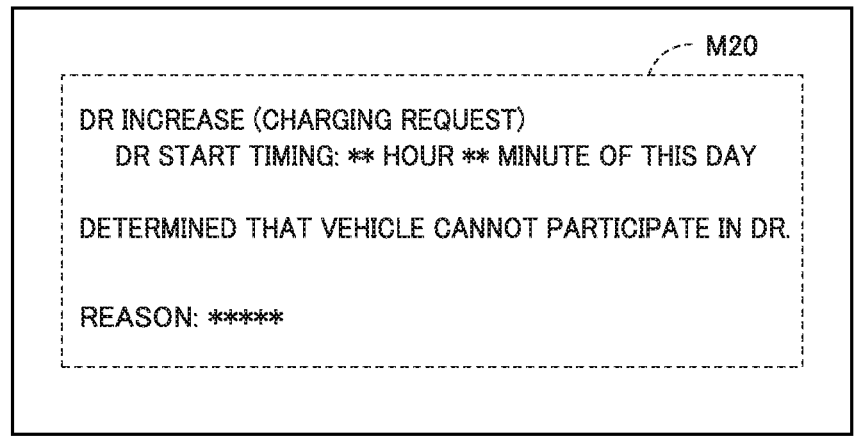
FIG. 18 is a diagram showing an exemplary screen shown in third notification processing.

FIG. 18 is a diagram showing an exemplary screen shown on TPD 302 in S192 in FIG. 11. Referring to FIG. 18, this screen includes a display section M20. Display section M20 shows a content of DR (for example, a type of DR and DR start timing) and shows a message that notifies a driver of EV 50 that the EV cannot participate in DR. Display section M20 shows also a reason why the EV cannot participate in DR. Examples of reasons shown in display section M20 include "insufficient remaining amount of power stored in battery 110" or "not being in time for DR start time."

As described above, in EV 50 on which the notification controller (ECU 200) according to this embodiment is mounted, when DR receiver 201a receives a target DR signal (YES in S11 and S14 in FIG. 11), participation determination unit 202a of ECU 200 determines whether or not EV 50 can participate in demand response (DR) at a prescribed DR participation spot based on the DR start timing indicated by the target DR signal, the position of EV 50 obtained by first obtaining unit 201b, and the remaining amount of power stored in battery 110 obtained by second obtaining unit 201c (S18 in FIG. 11, and FIG. 12). When participation determination unit 202a determines that the EV can participate (YES in S18 in FIG. 11), first notification unit 203 of ECU 200 causes TPD 302 to perform (S191 in FIG. 11) first notification processing (see, for example, FIGS. 13 and 14). When participation determination unit 202a determines that the EV cannot participate (NO in S18 in FIG. 11), first notification unit 203 does not perform first notification processing. According to such a configuration, lowering in convenience of a user due to issuance of a notification unnecessary for the user can be suppressed. According to ECU 200 described above, convenience of the user can be improved by appropriately giving a notification that invites a driver of EV 50 to participate in DR (that is, first notification processing).

Participation determination unit 202a may determine whether or not EV 50 can participate in demand response (DR) at a prescribed DR participation spot based on the DR end timing instead of the DR start timing. Alternatively, participation determination unit 202a may make determination above based on both of the DR start timing and the DR end timing. For example, ECU 200 may perform processing in FIG. 19 instead of the processing in FIG. 12. FIG. 19 is a diagram showing a modification of the processing shown in FIG. 12. The processing in FIG. 19 is the same as the processing in FIG. 12 except for adoption of S22A instead of S22. Referring to FIG. 19, in S22A, time period determination unit 202c determines whether or not EV 50 can reach the DR participation spot before end of DR based on the DR end timing (more specifically, the DR end timing indicated by the target DR signal) and the travel time period. When EV 50 can reach the DR participation spot before end of DR, EV 50 can participate in DR from a stage midway. Time period determination unit 202c according to this modification corresponds to an exemplary "fourth determination unit" according to the present disclosure.

In the embodiment, participation determination unit 202a determines whether or not each of a plurality of non-participation items is applicable (S21, S22, and S24 in FIG. 12), and when none of the non-participation items is applicable, the participation determination unit determines that the EV can participate. Though three non-participation items (S21, S22, and S24 in FIG. 12) are adopted in the embodiment, any number of non-participation items may be set and four or more non-participation items may be set. Any non-participation item may be added to the non-participation items adopted in the embodiment (FIG. 12) or the modification (FIG. 19). S24 may be omitted from the processing in FIG. 12 or the processing in FIG. 19.

The configuration of ECU 200 is not limited to the configuration shown in FIG. 6 and can be modified as appropriate. For example, when DR receiver 201a receives only a prescribed DR signal (target DR signal), DR determination unit 202f does not have to be provided.

Second Embodiment

A second embodiment of the present disclosure will be described. Since the second embodiment is in common to the first embodiment in many aspects, differences will mainly be described and description of aspects in common will not be provided.

Though the notification controller is mounted on an electrically powered vehicle (EV 50) in the first embodiment, the notification controller is mounted on a portable terminal in the second embodiment which will be described below. FIG. 20 is a diagram showing a portable terminal on which the notification controller according to the second embodiment is mounted.

Referring to FIG. 20, a portable terminal 80A according to this embodiment is a smartphone carried by a driver of EV 50. Portable terminal 80A includes a controller 81, a touch panel display (TPD) 83, and a communication interface (I/F) 84. Controller 81 includes a processor (not shown) and a storage 82. Controller 81 can wirelessly communicate with each of server 30 and EV 50 through communication I/F 84. Controller 81 includes information obtaining unit 201, determination unit 202, first notification unit 203, second notification unit 204, target SOC decision unit 204a, third notification unit 205, DR location setting unit 206, input unit 207, and mode switching unit 208. With the configuration similar to the configuration of ECU 200 shown in FIG. 6, controller 81 can carry out notification control as in the first embodiment. Controller 81 can obtain information to be used for notification control from EV 50. Controller 81 causes TPD 83 to perform notification processing (for example, first to third notification processing).

According to portable terminal 80A as well, by appropriately giving a notification that invites a driver of EV 50 to participate in DR, convenience of a user (driver) can be improved. The portable terminal on which the notification controller is mounted is not limited to the smartphone and the notification controller may be mounted on another portable terminal.

Third Embodiment

A third embodiment of the present disclosure will be described. Since the third embodiment is in common to the first embodiment in many aspects, differences will mainly be described and description of aspects in common will not be provided.

Though the notification controller is mounted on an electrically powered vehicle (EV 50) in the first embodiment, the notification controller is mounted on an aggregator server (server 30) in the third embodiment which will be described below. FIG. 21 is a diagram showing an aggregator server on which the notification controller according to the third embodiment is mounted.

Referring to FIG. 21, a server 30X according to this embodiment includes a controller 31 and a communication interface (I/F) 33. Controller 31 includes a processor (not shown) and a storage 32. Controller 31 can wirelessly communicate with each of EV 50 and portable terminal 80 through communication I/F 33. Controller 31 includes a DR request unit 31A, a DR transmitter 31B, an information obtaining unit 201A, a determination unit 202A, a first notification unit 203A, second notification unit 204, target SOC decision unit 204a, and DR location setting unit 206. Information obtaining unit 201A is identical in configuration to information obtaining unit 201 shown in FIG. 6 except for not including DR receiver 201a. Determination unit 202A is identical in configuration to determination unit 202 shown in FIG. 6 except for including a participation determination unit 202g instead of participation determination unit 202a. DR transmitter 31B, participation determination unit 202g, and first notification unit 203A according to this embodiment correspond to an exemplary "transmitter", an exemplary "determination unit," and an exemplary "notification unit" according to the present disclosure, respectively.

When participation determination unit 202g receives a second DR execution instruction from server 20, it determines whether or not EV 50 can participate in DR at a prescribed DR participation spot based on at least one of the timing of start and timing of end of demand response, a position of EV 50, and a remaining amount of power stored in battery 110. An approach the same as in the first embodiment described previously can be adopted as a determination approach. Controller 31 can obtain a state of EV 50, for example, by communicating with EV 50.

When DR request unit 31A receives the second DR execution instruction from server 20, it generates a DR signal in accordance with the second DR execution instruction. When DR request unit 31A receives the second DR execution instruction, it has storage 32 store information on DR (DR information) represented by the second DR execution instruction. When participation determination unit 202g determines that the EV can participate, DR transmitter 31B transmits the DR signal generated by DR request unit 31A to EV 50. When participation determination unit 202g determines that the EV cannot participate, DR transmitter 31B does not transmit the DR signal.

When DR transmitter 31B transmits a prescribed DR signal (target DR signal) to EV 50, first notification unit 203A causes notification apparatus 320 of EV 50 to perform notification processing for inviting EV 50 to go to the prescribed DR participation spot by transmitting a prescribed signal (more specifically, a signal indicating notification processing) to EV 50. The target DR signal is, for example, a DR signal in response to which DR is started before prescribed timing (that is, before a prescribed time period elapses since the current time). First notification unit 203A may cause NAVI system 300 or portable terminal 80 instead of notification apparatus 320 to perform notification processing.

According to server 30X (aggregator server) as well, by appropriately giving a notification that invites a driver of EV 50 to participate in DR, convenience of a user (driver) can be improved.

Other Embodiments

The configuration of the VGI system is not limited to the configuration shown in FIG. 1. Though electric power utility company E1 requests an aggregator to participate in DR in the embodiment, an electric power market may request an aggregator to participate in DR. The aggregator may make a profit by dealing in the electric power market (for example, a deal of a capacity or adjustment capability). Though the aggregator is divided into upper aggregator E2 and lower aggregator E3 in the embodiment (see FIG. 1), upper aggregator E2 and lower aggregator E3 may be integrated. A leveling signal is not limited to the DR signal, and it may be, for example, a signal that requests power leveling from one demand side (for example, an individual or a corporate) to another demand side (for example, an individual or a corporate), or may be a signal (for example, a signal that requests external charging at home) automatically transmitted from a communication apparatus at home to an electrically powered vehicle (or a portable terminal carried by a user) when an amount of power generation in a self-generation facility installed in the user's house (or an amount of electric power stored in the power storage) becomes large.

A configuration of the electrically powered vehicle included in the VGI system is not limited to the configuration shown in FIG. 3. It is not essential that the electrically powered vehicle includes a power feeder. For example, a charger capable of only external charging may be adopted instead of charger-discharger 150 in the configuration shown in FIG. 3. The electrically powered vehicle is not limited to an electric vehicle (EV) and at least one or all of electrically powered vehicles included in the VGI system may be a plug-in hybrid vehicle (PHV).

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A notification controller that controls a notification apparatus that gives a notification to a driver of an electrically powered vehicle including an externally chargeable power storage, the notification controller comprising an electronic control unit that:
receives a leveling signal that requests power leveling where power leveling at least includes the electrically powered vehicle supplying power to a power grid;
obtains a position of the electrically powered vehicle;
obtains a remaining amount of power stored in the power storage;

switches, among setting modes of a participation spot, the setting modes including a first mode and a second mode;

accepts, in the first mode, input of an inputted participation spot by a user and sets the inputted participation spot;

selects, in the second mode, a selected participation spot from among a plurality of predetermined locations based on at least one of the position of the electrically powered vehicle, a direction of travel of the electrically powered vehicle, a travel route of the electrically powered vehicle, and a current time, and sets the selected participation spot;

determines, upon receiving a prescribed leveling signal, whether the electrically powered vehicle can participate in the power leveling at a prescribed participation spot, based on at least one of timing of start and timing of end of power leveling indicated by the prescribed leveling signal, the position of the electrically powered vehicle, and the remaining amount of power stored in the power storage, the prescribed participation spot being one of the inputted participation spot and the selected participation spot set in the first mode or the second mode;

causes, upon determination that the electrically powered vehicle can participate, the notification apparatus to perform first notification processing for inviting the electrically powered vehicle to go to the prescribed participation spot; and upon determination that the electrically powered vehicle cannot participate, causes the notification apparatus to notify the driver of the electrically powered vehicle that the electrically powered vehicle cannot participate in power leveling.

2. The notification controller according to claim 1, wherein the electronic control unit:

obtains a travel route from the position of the electrically powered vehicle to the prescribed participation spot; and determines whether the electrically powered vehicle can reach the prescribed participation spot by traveling in accordance with the travel route, without increasing the remaining amount of power stored in the power storage by external charging, wherein upon determination that the electrically powered vehicle cannot reach the prescribed participation spot, the electronic control unit determines that the electrically powered vehicle cannot participate in the power leveling.

3. The notification controller according to claim 1, wherein the electronic control unit:

obtains a travel time period required for reaching the prescribed participation spot from the position of the electrically powered vehicle; and determines whether the electrically powered vehicle can reach the prescribed participation spot before start of the power leveling, based on the timing of start of the power leveling and the travel time period, wherein upon determination that the electrically powered vehicle cannot reach the prescribed participation spot, the electronic control unit determines that the electrically powered vehicle cannot participate in the power leveling.

4. The notification controller according to claim 1, wherein the electronic control unit:

obtains a travel time period required for reaching the prescribed participation spot from the position of the electrically powered vehicle; and determines whether the electrically powered vehicle can reach the prescribed participation spot before end of the power leveling, based on the timing of end of the power leveling and the travel time period, wherein upon determination that the electrically powered vehicle cannot reach the prescribed participation spot, the electronic control unit determines that the electrically powered vehicle cannot participate in the power leveling.

5. The notification controller according to claim 3, wherein the electronic control unit calculates the travel time period based on a history of travel of the electrically powered vehicle.

6. The notification controller according to claim 1, wherein the electronic control unit:

predicts an arrival-timing SOC that represents the remaining amount of power stored in the power storage at timing of arrival of the electrically powered vehicle at the prescribed participation spot; and determines whether the predicted arrival-timing SOC is within a first range, wherein upon determination that the arrival-timing SOC is out of the first range, the electronic control unit determines that the electrically powered vehicle cannot participate in the power leveling.

7. The notification controller according to claim 6, wherein the prescribed leveling signal represents a type and an amount of demand response that requests the power leveling, and the electronic control unit:

determines a second range narrower than the first range, based on the type and the amount of the demand response represented by the prescribed leveling signal;

determines, upon determination that the electrically powered vehicle can participate, whether the predicted arrival-timing SOC is within the second range; and causes, upon determination that the arrival-timing SOC is not within the second range, the notification apparatus to perform second notification processing for inviting the driver to modify a condition for travel of the electrically powered vehicle so as to bring the arrival-timing SOC closer to the second range.

8. The notification controller according to claim 1, wherein:

the plurality of predetermined locations include a home and a workplace of a user of the electrically powered vehicle; and the electronic control unit, in the second mode:

determines whether the electrically powered vehicle is traveling for going to work or traveling for going home, based on at least one of the position of the electrically powered vehicle, the direction of travel of the electrically powered vehicle, the travel route of the electrically powered vehicle, and the current time;

selects the workplace from among the plurality of predetermined locations when the electrically powered vehicle is determined as traveling for going to work; and selects the home from among the plurality of predetermined locations when the electrically powered vehicle is determined as traveling for going home.

9. The notification controller according to claim 8, wherein the electronic control unit selects one of a plurality of predetermined locations and sets the selected location as the prescribed participation spot in the notification controller, wherein:

the electrically powered vehicle includes a car navigation system, the car navigation system including a touch panel display;
the notification apparatus includes the touch panel display; and
the electronic control unit:
causes, upon determination that the prescribed participation spot is the home and the electrically powered vehicle can participate, the touch panel display to display a first screen, the first screen inviting the electrically powered vehicle to go to the home; and
causes, upon determination that the prescribed participation spot is the workplace and the electrically powered vehicle can participate, the touch panel display to display a second screen, the second screen inviting the electrically powered vehicle to go to the workplace.

10. The notification controller according to claim 1, wherein the plurality of predetermined locations includes a home and a workplace of a user of the electrically powered vehicle, and the electronic control unit, in the second mode:
selects the workplace from among the plurality of predetermined locations when the current time is within a first time period; and
selects the home from among the plurality of predetermined locations when the current time is within a second time period.

11. The notification controller according to claim 1, wherein
the prescribed leveling signal is the leveling signal in response to which the power leveling is started before prescribed timing.

12. The notification controller according to claim 1, wherein
the notification apparatus includes at least one of a meter panel of the electrically powered vehicle, a car navigation system mounted on the electrically powered vehicle, a display provided on a windshield of the electrically powered vehicle, a smart speaker mounted on the electrically powered vehicle, an indicator that gives a notification by a state of illumination in the electrically powered vehicle, and a portable terminal.

13. An electrically powered vehicle comprising the notification controller according to claim 1.

14. The notification controller according to claim 10, wherein:
the electrically powered vehicle includes a car navigation system, the car navigation system including a touch panel display;
the notification apparatus includes the touch panel display; and
the electronic control unit:
causes, upon determination that the prescribed participation spot is the home and the electrically powered vehicle can participate, the touch panel display to display a first screen, the first screen inviting the electrically powered vehicle to go to the home, and
causes, upon determination that the prescribed participation spot is the workplace and the electrically powered vehicle can participate, the touch panel display to display a second screen, the second screen inviting the electrically powered vehicle to go to the workplace.

15. A notification controller that controls a notification apparatus that gives a notification to a driver of an electrically powered vehicle including an externally chargeable power storage, the notification controller comprising an electronic control unit that:
requests power leveling to the electrically powered vehicle where power leveling at least includes the electrically powered vehicle supplying power to a power grid;
obtains a position of the electrically powered vehicle;
obtains a remaining amount of power stored in the power storage;
switches, among setting modes of a participation spot, the setting modes including a first mode and a second mode;
accepts, in the first mode, input of an inputted participation spot by a user and sets the inputted participation spot;
selects, in the second mode, a selected participation spot from among a plurality of predetermined locations based on at least one of the position of the electrically powered vehicle, a direction of travel of the electrically powered vehicle, a travel route of the electrically powered vehicle, and a current time, and sets the selected participation spot;
determines whether the electrically powered vehicle can participate in the power leveling at a prescribed participation spot, based on at least one of timing of start and timing of end of the power leveling, the position of the electrically powered vehicle, and the remaining amount of power stored in the power storage, the prescribed participation spot being one of the inputted participation spot and the selected participation spot set in the first mode or the second mode;
transmits the leveling signal to the electrically powered vehicle upon determination that the electrically powered vehicle can participate;
causes, upon transmission of a prescribed leveling signal to the electrically powered vehicle, the notification apparatus to perform notification processing for inviting the electrically powered vehicle to go to the prescribed participation spot; and
upon determination that the electrically powered vehicle cannot participate, causes the notification apparatus to notify the driver of the electrically powered vehicle that the electrically powered vehicle cannot participate in power leveling.

* * * * *